(12) United States Patent
Melkote Krishnaprasad et al.

(10) Patent No.: US 12,299,826 B2
(45) Date of Patent: May 13, 2025

(54) MULTI-LAYER REPROJECTION TECHNIQUES FOR AUGMENTED REALITY

(71) Applicant: QUALCOMM Incorporated, San Diego, CA (US)

(72) Inventors: Vinay Melkote Krishnaprasad, Bangalore (IN); Sandeep Kanakapura Lakshmikantha, Bangalore (IN); Sagar Ravindra Kalbande, Chandrapur (IN); Sudipto Banerjee, Bangalore (IN); Ajit Venkat Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/917,837

(22) PCT Filed: May 7, 2021

(86) PCT No.: PCT/US2021/031409
§ 371 (c)(1),
(2) Date: Oct. 7, 2022

(87) PCT Pub. No.: WO2021/226535
PCT Pub. Date: Nov. 11, 2021

(65) Prior Publication Data
US 2023/0039100 A1    Feb. 9, 2023

(30) Foreign Application Priority Data
May 8, 2020   (IN) .............................. 202041019594

(51) Int. Cl.
*G06T 19/00*     (2011.01)
(52) U.S. Cl.
CPC ................................. *G06T 19/006* (2013.01)

(58) Field of Classification Search
CPC ................................................... G06T 19/006
See application file for complete search history.

(56) References Cited

U.S. PATENT DOCUMENTS

| 10,672,197 B2 | 6/2020 | Bates |
| 10,733,789 B2 | 8/2020 | Croxford et al. |

(Continued)

FOREIGN PATENT DOCUMENTS

| CN | 108665530 A | 10/2018 |
| CN | 109996058 A | 7/2019 |
| CN | 110388919 A | 10/2019 |

OTHER PUBLICATIONS

International Search Report and Written Opinion—PCT/US2021/031409—ISA/EPO—Aug. 30, 2021.
Taiwan Search Report—TW110116539—TIPO—Aug. 26, 2024.

*Primary Examiner* — Ryan Mcculley
(74) *Attorney, Agent, or Firm* — Procopio, Cory, Hargreaves & Savitch

(57) ABSTRACT

This disclosure provides systems, devices, apparatus and methods, including computer programs encoded on storage media, for multi-layer reprojection techniques for augmented reality. A display processor may obtain a layer of graphics data including a plurality of virtual objects. Each the plurality of virtual objects may be associated with at least one bounding box of a plurality of bounding boxes. The display processor may further obtain metadata indicative of at least one edge of the at least one bounding box of the plurality of bounding boxes, and metadata corresponding to reprojection instructions associated with each of the plurality of bounding boxes. The display processor may reproject the plurality of virtual objects based on the metadata indicative of the at least one edge of the at least one bounding box and the metadata corresponding to the reprojection instructions.

33 Claims, 15 Drawing Sheets

(56) References Cited

U.S. PATENT DOCUMENTS

| | | | |
|---|---|---|---|
| 2005/0180647 A1* | 8/2005 | Curry | G06T 7/90 |
| | | | 382/302 |
| 2014/0119657 A1* | 5/2014 | Gupta | G06T 7/187 |
| | | | 382/180 |
| 2017/0004648 A1* | 1/2017 | Li | G02B 27/017 |
| 2018/0276824 A1 | 9/2018 | Haraden et al. | |
| 2019/0012826 A1 | 1/2019 | Melkote Krishnaprasad et al. | |
| 2019/0066365 A1 | 2/2019 | Schmalstieg et al. | |
| 2019/0333263 A1 | 10/2019 | Melkote Krishnaprasad et al. | |
| 2020/0027194 A1 | 1/2020 | Nourai et al. | |
| 2020/0051342 A1* | 2/2020 | Bates | G06T 5/80 |
| 2020/0280739 A1* | 9/2020 | Fitzgerald | H04N 21/816 |
| 2021/0142575 A1* | 5/2021 | Taylor | H04N 13/128 |
| 2021/0258555 A1* | 8/2021 | Leiby | H04N 13/344 |

* cited by examiner

MULTI-LAYER REPROJECTION TECHNIQUES FOR AUGMENTED REALITY

CROSS REFERENCE TO RELATED APPLICATION

This application is a National Stage Application filed under 35 U.S.C. § 371 of PCT International Application No. PCT/US2021/031409, entitled "MULTI-LAYER REPROJECTION TECHNIQUES FOR AUGMENTED REALITY" and filed May 7, 2021, which claims the benefit of Indian Application No. 202041019594, entitled "MULTI-LAYER REPROJECTION TECHNIQUES FOR AUGMENTED REALITY" and filed on May 8, 2020, which are expressly incorporated by reference herein in their entirety.

TECHNICAL FIELD

The present disclosure relates generally to processing systems, and more particularly, to multi-layer reprojection techniques.

INTRODUCTION

Computing devices often perform graphics processing (e.g., utilizing a graphics processing unit (GPU)) to render graphical data for display by the computing devices. Such computing devices may include, for example, extended reality (XR) devices such as AR devices and/or VR devices, computer workstations, mobile phones such as smartphones, embedded systems, personal computers, tablet computers, video game consoles, and the like. GPUs are configured to execute a graphics processing pipeline that includes one or more processing stages which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

Virtual content for an XR device may be rendered based on a perspective of a user.

As the perspective of the user changes, a perspective of the virtual content may likewise need to be changed. As such, there is a need for improving reprojection techniques for virtual content.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

AR applications may utilize head pose information to render virtual content that may be projected into a "real world" field of view based on a perspective of a user. Nevertheless, from a time that the virtual content is rendered to a time that the virtual content is displayed, the perspective/head pose of the user may have changed, which may cause a registration error for the virtual content (e.g., the virtual content may appear to be out of perspective). To address potential registration errors, the virtual content may be warped/reprojected to modify the perspective of the virtual content immediately prior to displaying the virtual content in a frame. However, given that different virtual objects included in the virtual content may be registered to different points in the real world (e.g., at varying depths), applying a same homography to warp/reproject all of the different virtual objects at varying depths may not decrease registration errors with respect to all of the virtual objects.

Accordingly, virtual objects included in a single layer eye buffer may be separately identified from the single layer eye buffer and respectively associated with multiple layers. The multiple layers may be based on different depth values. A reprojection engine that identifies the multiple layers including the virtual objects may perform per layer reprojection on the virtual objects, rather than single layer reprojection, to decrease registration errors with respect to each of the virtual objects. The multiple layers may correspond to bounding boxes that are respectively defined around the virtual objects identified from the single layer eye buffer. After the virtual objects are separately reprojected, the virtual objects may be composited into a single frame to be displayed at a display device.

In an aspect of the disclosure, a method, a computer-readable medium, and an apparatus are provided. The apparatus may obtain a layer of graphics data including a plurality of virtual objects, wherein each of the plurality of virtual objects is associated with at least one bounding box of a plurality of bounding boxes; obtain metadata indicative of at least one edge of the at least one bounding box of the plurality of bounding boxes; obtain metadata corresponding to reprojection instructions associated with each of the plurality of bounding boxes; and reproject the plurality of virtual objects based on the metadata indicative of the at least one edge of the at least one bounding box and the metadata corresponding to the reprojection instructions.

In another aspect of the disclosure, a method, a computer-readable medium, and an apparatus are provided. The apparatus may render a plurality of virtual objects in a layer, wherein each of the plurality of virtual objects is associated with at least one bounding box of a plurality of bounding boxes; determine metadata indicative of at least one edge of the at least one bounding box of the plurality of bounding boxes; determine metadata corresponding to reprojection instructions associated with each of the plurality of bounding boxes; and transmit, for reprojection of the plurality of virtual objects, the metadata indicative of the at least one edge of the bounding box and the metadata corresponding to the reprojection instructions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
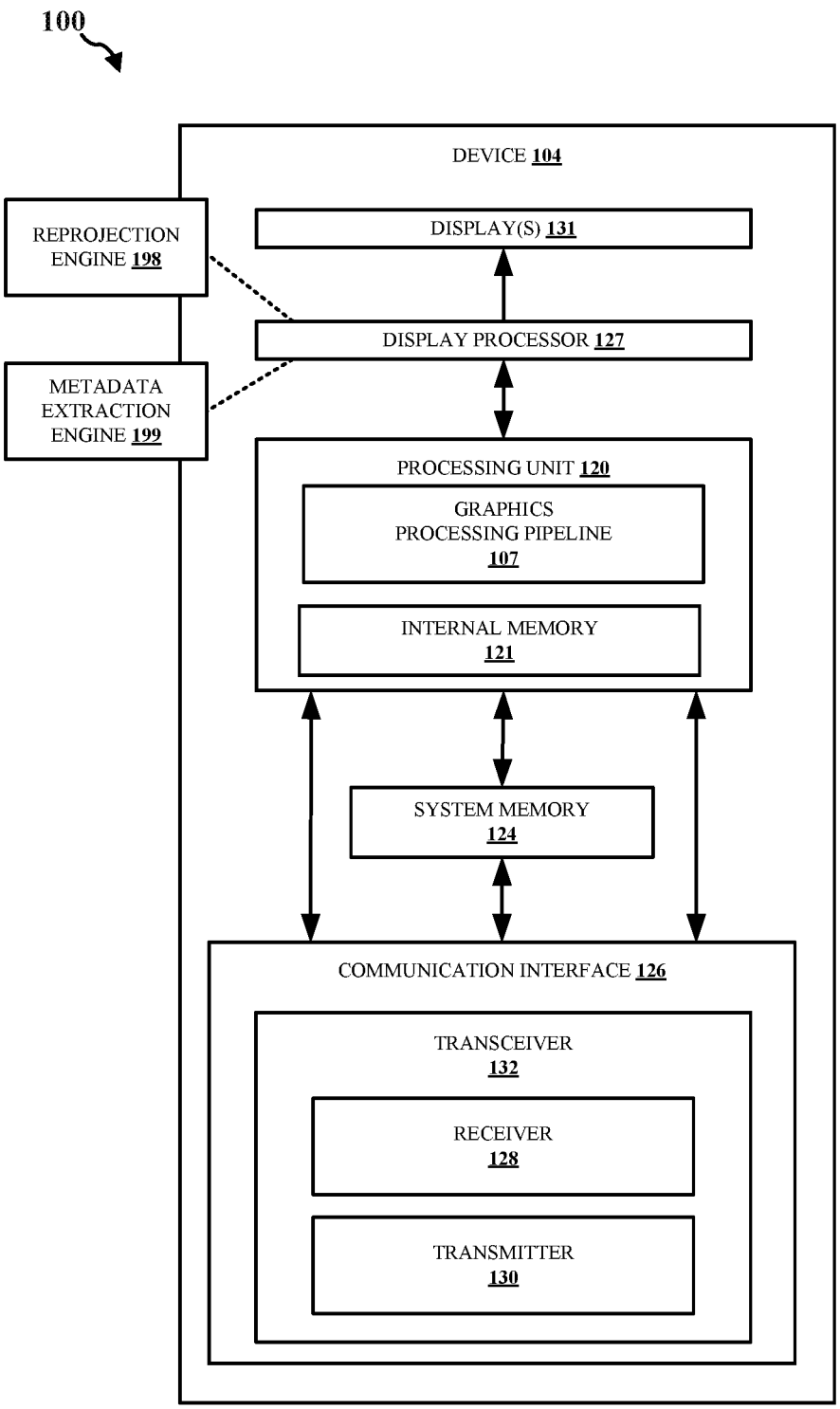
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

AR applications may utilize head pose information to render virtual content that may be projected into a "real world" field of view based on a perspective of a user. Nevertheless, from a time that the virtual content is rendered to a time that the virtual content is displayed, the perspective/head pose of the user may have changed, which may cause a registration error for the virtual content (e.g., the virtual content may appear to be out of perspective). To address potential registration errors, the virtual content may be warped/reprojected to modify the perspective of the virtual content immediately prior to displaying the virtual content in a frame. However, given that different virtual objects included in the virtual content may be registered to different points in the real world (e.g., at varying depths), applying a same homography to warp/reproj ect all of the different virtual objects at varying depths may not decrease registration errors with respect to all of the virtual objects.

Accordingly, virtual objects included in a single layer eye buffer may be separately identified from the single layer eye buffer and respectively associated with multiple layers. The multiple layers may be based on different depth values. A reprojection engine that identifies the multiple layers including the virtual objects may perform per layer reprojection on the virtual objects, rather than single layer reprojection, to decrease registration errors with respect to each of the virtual objects. The multiple layers may correspond to bounding boxes that are respectively defined around the virtual objects identified from the single layer eye buffer. After the virtual objects are separately reprojected, the virtual objects may be composited into a single frame to be displayed at a display device.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120 and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. In some examples, the device 104 may include a display processor, such as the display processor 127, to perform one or more display processing techniques on one or more frames generated by the processing unit 120 before the frames are displayed by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to the internal memory 121 over the bus or via a different connection. The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a reprojection engine 198 configured to obtain a layer of graphics data including a plurality of virtual objects, wherein each of the plurality of virtual objects is associated with at least one bounding box of a plurality of bounding boxes; obtain metadata indicative of at least one edge of the at least one bounding box of the plurality of bounding boxes; obtain metadata corresponding to reprojection instructions associated with each of the plurality of bounding boxes; and reproject the plurality of virtual objects based on the metadata indicative of the at least one edge of the at least one bounding box and the metadata corresponding to the reprojection instructions. In further aspects, the display processor 127 may include a metadata extraction engine 199 configured to render a plurality of virtual objects in a layer, wherein each of the plurality of virtual objects is associated with at least one bounding box of a plurality of bounding boxes; determine metadata indicative of at least one edge of the at least one bounding box of the plurality of bounding boxes; determine metadata corresponding to reprojection instructions associated with each of the plurality of bounding boxes; and transmit, for reprojection of the plurality of virtual objects, the metadata indicative of the at least one edge of the bounding box and the metadata corresponding to the reprojection instructions.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) associated with the disclosed embodiments.

Figure 2:
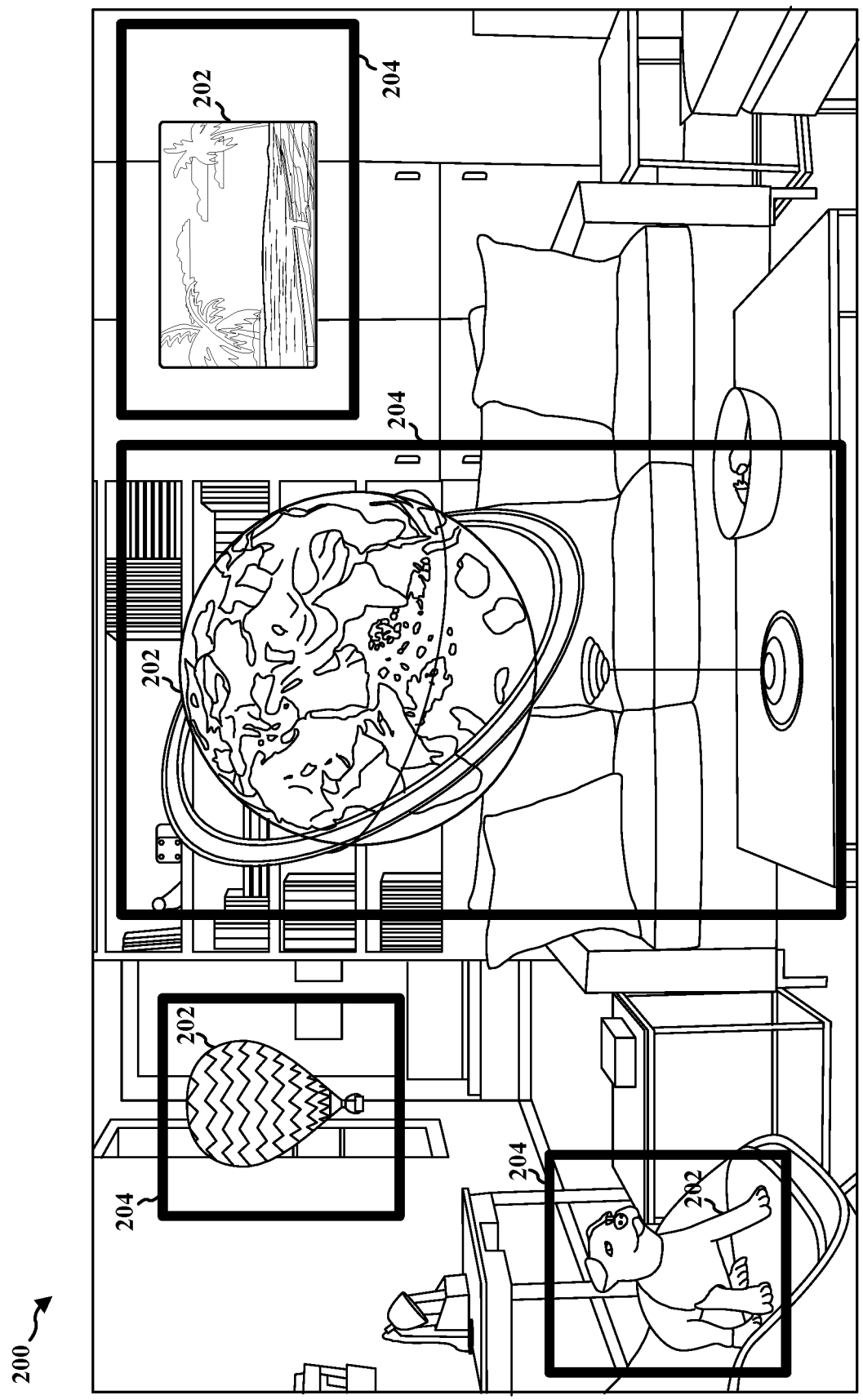
FIG. 2 illustrates a plurality of virtual objects projected into a field of view in accordance with one or more techniques of this disclosure.

FIG. 2 illustrates a field of view 200 having a plurality of virtual objects 202 projected into the field of view 200 in accordance with one or more techniques of this disclosure. Generated content for both augmented reality (AR) and virtual reality (VR) may be configured to appear as static/fixed in the "real world" (e.g., via an anchor point). For example, a generated virtual object 202 may be configured to appear as though the object remains in a same location as the perspective of the user changes, similar to a manner in which the object may be expected to behave in the real world. Thus, rendering virtual objects 202 in the field of view 200 may include determining information associated with a head pose of the user, so that the virtual object 202 may be displayed based on a corresponding perspective of the user. However, from a time that the virtual object 202 is rendered to a time that the virtual object 202 is displayed, the perspective/head pose of the user may have changed, which may result in a registration error. A registration error may occur when the virtual object 202 that is registered to a static object in the real world appears to the user to be out of position/not configured in accordance with a current user perspective.

In many cases, even minor registration errors may be noticeable to the user. A pose movement of 4 centimeters (cm) per frame with single-layer warping for 1 meter (m) of depth may result in an error rate of 1.70 at a depth of 4 m. As the human eye may be able to perceive separation at one-sixtieth of a degree, being able to maintain anchored virtual content such that the content appears to be fixed in the real world may affect a quality of an AR application.

Accordingly, registration of virtual content to the real world may be impacted by a latency between a time that the content is rendered and a time that the content is displayed (e.g., motion-to-render-to-photon (m2r2p) latency) and/or a render rate relative to a display rate (e.g., a slow render rate with respect to the display rate may cause jitter/registration errors). For instance, if the display rate is 90 frames per second and the render rate is 45 frames per second, every other frame may be a repeat of a preceding frame. More specifically, the virtual object 202 in each frame may be displayed twice at a same location under such conditions, which may cause the virtual object 202 to appear less realistic as the perspective of the user changes. While a changing head pose of the user may be associated with a smooth change of perspective, the virtual object 202 may nonetheless appear to move in incremental steps as a result of a slow rendering rate.

To address potential registration errors, a rendered frame may be warped/reprojected immediately prior to displaying the frame for modifying the perspective of the content based on a currently identified head pose. Such modifications may utilize asynchronous time-warp (ATW) reprojection to decrease latency associated with changes to the head pose. That is, ATW may warp/reproject the rendered content immediately prior to displaying the content based on a determined homography. While the homography may hide some artifacts of the displayed content, basing an entire rotation for the field of view 200 on user orientation may not sufficiently address potential registration errors.

Approximations for rendering/warping the virtual objects 202 may be further performed based on an asynchronous planar reprojection (APR). As used herein, APR refers to a technique where, for a rendering plane determined by a computer shader and plane parameters determined at render time from a depth buffer, an approximated rendering plane is mapped to an image plane via homography prior to display. APR may be used to enhance ATW techniques, as APR may account for head position changes in addition to user orientation (e.g., translation and rotation). However, even with APR, some artifacts may still be observed by the user since neither APR nor ATW may account for varying depths of the different virtual objects 202 included in the field of view 200. For example, APR and ATW reprojection techniques may be based on background objects being located at infinity when modifying a perspective of the displayed content. For virtual objects 202 that appear to be very far away, registration errors may not be observable by the user. However, for virtual objects 202 that appear to be closer than infinity, registration errors of such virtual objects may be more noticeable to the user.

Given that different virtual object 202 in AR may be registered to different points in the real world (e.g., at varying depths), applying a single homography to an entire frame may not reduce registration errors for all of the virtual objects 202 at the varying depths of the frame. Accordingly, multiple layers may be associated with the different virtual objects 202 to provide respective depth values for the different virtual objects 202. For example, rather than rendering content based on a single layer eye buffer, the content may be rendered and associated with separate/multiple layers for the different virtual objects 202, which may be separately warped (e.g., per layer warping) to decrease registration errors with respect to each of the virtual objects 202. That is, each of the virtual objects 202 in the frame may be separately extracted and independently warped immediately prior to being displayed. Such an approach may result in more accurate registration of virtual objects 202 to the real world and collectively decrease registration errors of all the virtual objects 202 in the frame. Each virtual object 202 may be included in respective bounding boxes 204 (e.g., which may include gridded tiles) that correspond to the separately rendered layers for separately reprojecting the virtual objects 202 prior to composition and display of the virtual objects 202 into the single frame.

In certain configurations, the multiple layers may be generated by an AR application. In other configurations, multiple/different applications that generate different content may have separate eye buffers that are composited together prior to being displayed, such that the separate eye buffers may be used to define the multiple/different layers for warping. In still other configurations, content that includes multiple virtual objects 202 of different depths may be generated in a single layer eye buffer from which the multiple virtual objects 202 may be extracted and included in multiple non-overlapping "pseudo layers" that may be individually warped. Metadata for warping each of the pseudo layers may be extracted during the rendering process to perform metadata-specific APR homography and compositing the pseudo layers together for display. The render plane parameters (e.g., a, b, c,) for each pseudo layer may include the APR metadata for that layer. For example, the eye buffer and the plane parameters may be provided to the compositor to modify the eye buffer before displaying the warped virtual object 202 based on a changed user pose. The plane parameters in the metadata may be computed separately for each of the pseudo layers.

Figure 3:
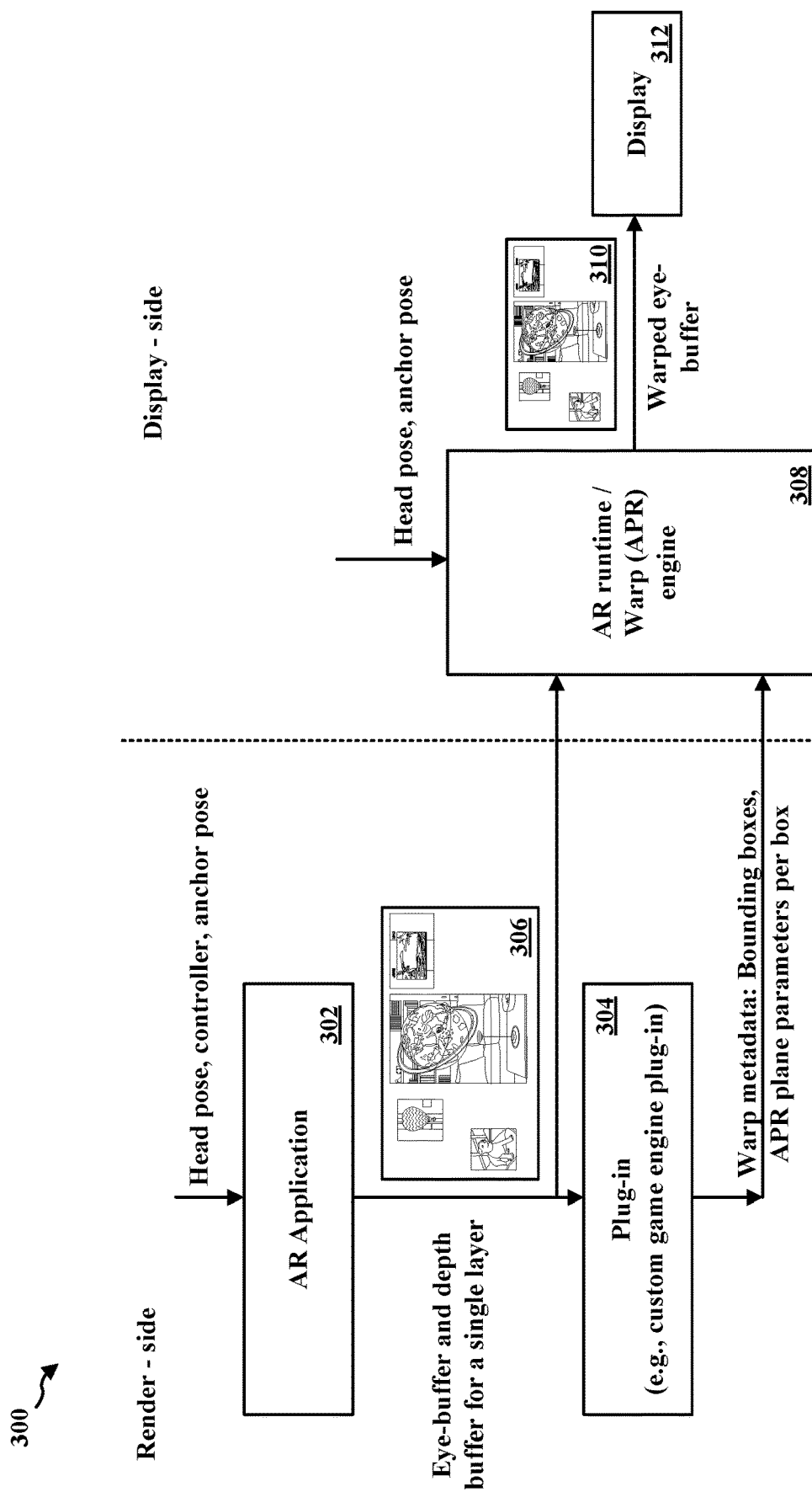
FIG. 3 is a flow diagram for determining multiple layers to be used for warping virtual content in accordance with one or more techniques of this disclosure.

FIG. 3 is a flow diagram 300 for determining multiple layers to be used for warping virtual content in accordance with one or more techniques of this disclosure. For AR applications 302 that generate virtual content based on a single eye buffer, multiple layers (e.g., pseudo layers) may be separately extracted for reprojection/warping based on a display pose. Content from the AR application 302 may be processed on both a render-side and a display-side of a processing system, which are separated by the dashed line in the flow diagram 300. Rendering and display of virtual content from the AR application 302 may be performed by a same device or by different devices (e.g., by AR glasses or by a smartphone and connected AR glasses). The display-side of the processing system is generally performed at a display device (e.g., the AR glasses). The render-side of the processing system may receive an input at the AR application 302, such as a head pose input, a controller input, an anchor pose input, etc., to generate/anchor virtual content with respect to the real world. Based on the input, the AR application 302 may render the eye buffer and/or depth buffer for an image frame 306. Blank space in the image frame 306 may correspond to a transparent area of the eye buffer where, for example, a user wearing the AR glasses may observe the real world. Filled space/non-transparent areas of the eye buffer may correspond to the virtual content generated based on the AR application 302.

A plug-in 304 (e.g., a custom game engine plug-in) may be used to determine bounding box information and warp parameters for each of the bounding boxes and/or for each tile of a gridded bounding box based on the eye buffer and the depth buffer received from the AR application 302. In other configurations, the bounding box/tile information and the warp parameters may be determined by the AR application 302. Bounding boxes defined around the virtual content received from the AR application 302 may correspond to respective pseudo layers. For each bounding box, the plug-in 304 may identify metadata for respectively warping the content included in the bounding boxes, where the metadata may be specific to each bounding box/tile.

The eye buffer and the metadata associated with the bounding boxes and the plane parameters may be provided to an AR runtime/warp (APR) engine 308 on the display-side of the processing system. The AR runtime/warp (APR) engine 308 may receive an input for determining a current head pose, anchor pose, etc., to independently warp the content included in each of the bounding boxes associated with the separate/multiple layers. The warped content 310 may be provided to a display 312 via a warped eye buffer. Without metadata from the plug-in 304, the AR runtime/warp (APR) engine 308 may otherwise warp all of the content of the eye buffer/image frame 306 together based on single layer parameters.

The depth buffer used to determine the warp metadata may be further used to determine the bounding boxes/tiles. Virtual objects that are visually adjacent to each other after being projected into the viewing plane may be at different depths relative to the user and may be displayed based on the separate layers. If there is no depth information for two objects that are close together, the bounding boxes that correspond to the two objects may end up being combined into a single bounding box. However, since the content of the rendered eye buffer may be located at different depths, a registration error may occur if a same homography is applied to all of the content in a combined/single bounding box. With the addition of depth information, smaller bounding boxes or tiles of a gridded bounding box that correspond to different depths may be determined for displaying the content at the display 312 via the warped eye buffer.

In some cases, the AR application 302 may not provide a depth buffer. Thus, a depth of the content may be determined from a depth buffer by performing a depth-from-stereo (DFS) between a left eye buffer and a right eye buffer that may be associated with the eye buffer. For example, the depth of the content may be determined based on a geometric comparison between the left eye buffer and the right eye buffer, such that the content may be reprojected as if the depth buffer had been provided from the AR application 302.

Figure 4:
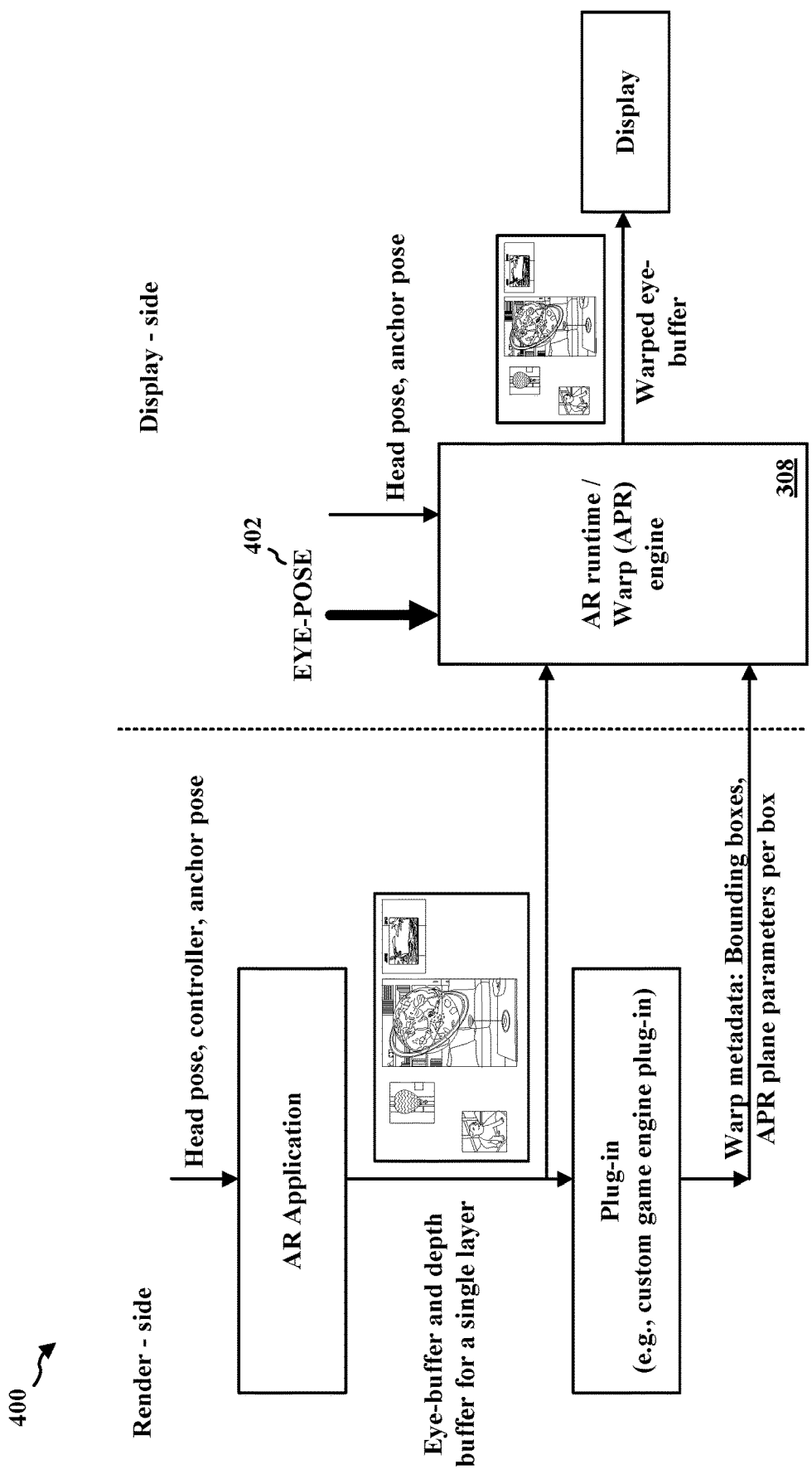
FIG. 4 is a flow diagram for warping virtual content based on eye-pose information received by a warp engine in accordance with one or more techniques of this disclosure.

FIG. 4 is a flow diagram 400 for warping virtual content based on eye-pose information 402 received by a warp engine in accordance with one or more techniques of this disclosure. The flow diagram 400 may be similar to the flow diagram 300, but with the addition of the eye-pose information 402 being received by the AR runtime/warp (APR) engine 308. The eye-pose information 402 may be generated based on eye-tracking techniques (e.g., of AR glasses) and may be indicative of a direction that an eye of the user is observing. Thus, some bounding boxes may have a higher priority than other bounding boxes based on the direction that the eye is observing. A same homography applied to a high priority bounding box may also be applied to the entire eye buffer.

As the eye-pose of the user changes, the homography applied to the entire eye buffer may also be changed based on the eye-pose information indicating that a different bounding box is currently being observed by the user. While warping the entire eye buffer based on a same homography may cause a registration error at an outlying location/bounding box, the registration error may not be observed by the user as the outlying location/bounding box may be peripheral to a current focal direction of the user. Thus, the eye-pose information may be indicative of a location in the field of view that the user is currently focusing, such that the APR metadata corresponding to a bounding box of the location may be used to derive a homography applied to the entire eye buffer. In aspects where more than one bounding box is within the focal direction of the eye, each of the bounding boxes may be warped using the APR metadata for the more than one boxes. However, other bounding boxes located outside a focal region may be warped using metadata corresponding to one of the bounding boxes within the focal region.

Figure 5:
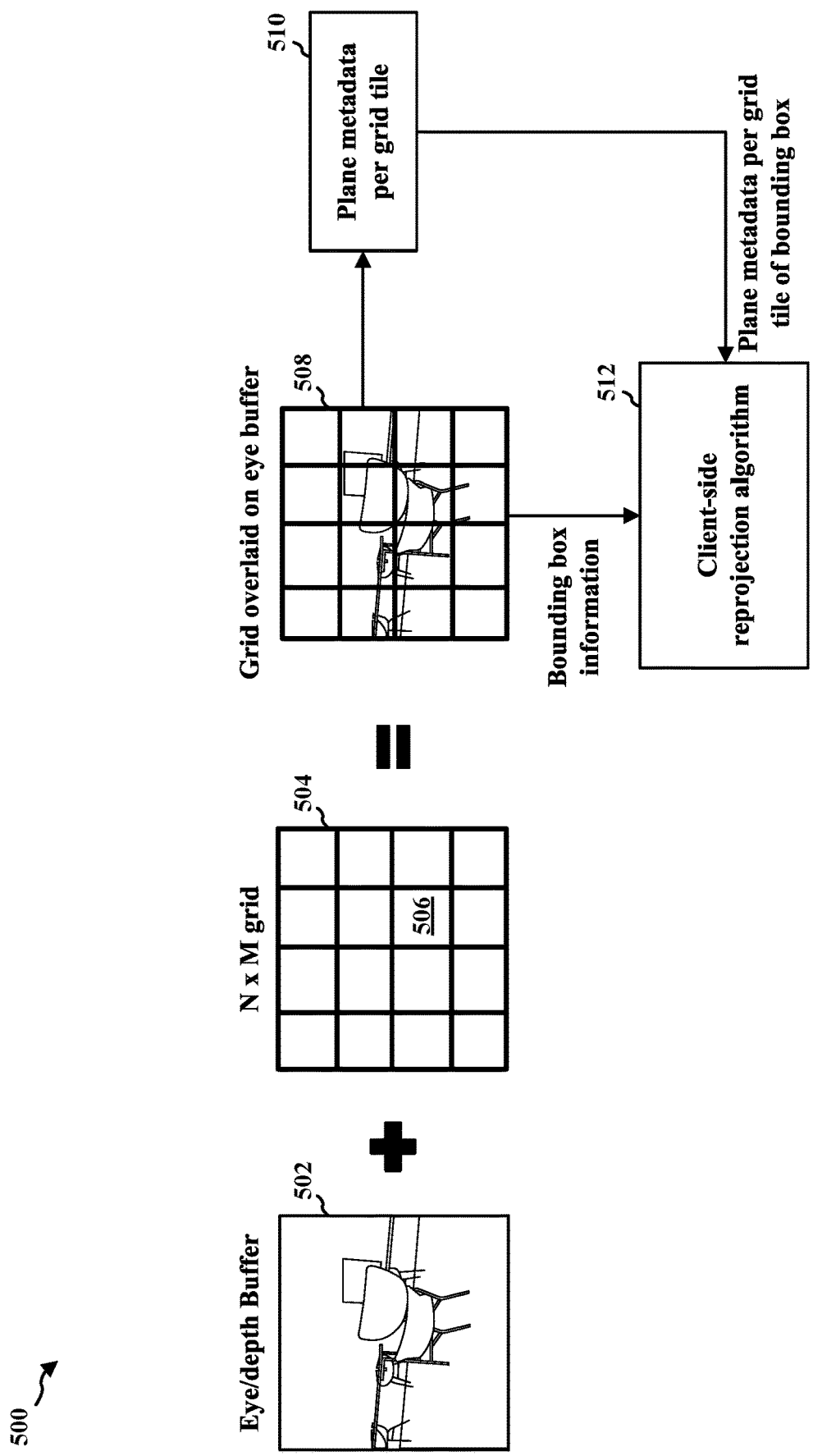
FIG. 5 is a diagram for defining a gridded bounding box in accordance with one or more techniques of this disclosure.

FIG. 5 is a diagram 500 for defining a gridded bounding box 508 having metadata 510 associated with one or more tiles 506 of a grid 504 in accordance with one or more techniques of this disclosure. Bounding box information for a bounding box 502 may be extracted from an eye buffer and/or a depth buffer on a server-side of a wireless network. Metadata 510 corresponding to content included within the bounding box 502 may be further extracted to determine one or more planes for the bounding box 502. The metadata 510 and the bounding box information (e.g., indicative of a perimeter of the bounding box 502) may be transmitted to a client-side of the wireless network for reprojecting the content. That is, a reprojection algorithm 512 may use the metadata 510 and the bounding box information to reproject the content, texture, etc., onto a display space.

Rather than defining the bounding box 502 based on locations of transparencies within the eye buffer, the bounding box 502 may be defined in some configurations via the grid 504 (e.g., an N×M grid having N×M grid tiles 506). In examples, the grid 504 may be a 4×4 grid having 16 grid tiles 506. In further examples, each grid tile 506 may correspond to a separate bounding box. The grid may be overlaid on the eye buffer for subdividing the content of the eye buffer via the gridded bounding box 508. Plane metadata 510 from the eye buffer may be determined per grid tile 506 and transmitted to the reprojection algorithm 512 on the client-side of the wireless network. Each grid tile 506 may further include depth buffer information utilized to determine parameters, metadata, etc., for reprojecting the content of the grid tiles 506 included in the gridded bounding box 508. Thus, the reprojection algorithm 512 may receive the bounding box information and the plane metadata 510 per grid tile 506 of the gridded bounding box 508, such that eye buffer texture may be reprojected onto the display space by the reprojection algorithm 512 on a per grid tile basis based on the metadata 510.

The grid tiles 506 of the grid 504 may be uniformly distributed throughout the bounding box 502 or distributed based on other techniques. For example, a grid tile 506 may be merged with one or more other grid tiles 506. Additionally or alternatively, one or more of the grid tiles 506 may be subdivided into smaller grid tiles, which may or may not be merged with each other.

Figure 6:
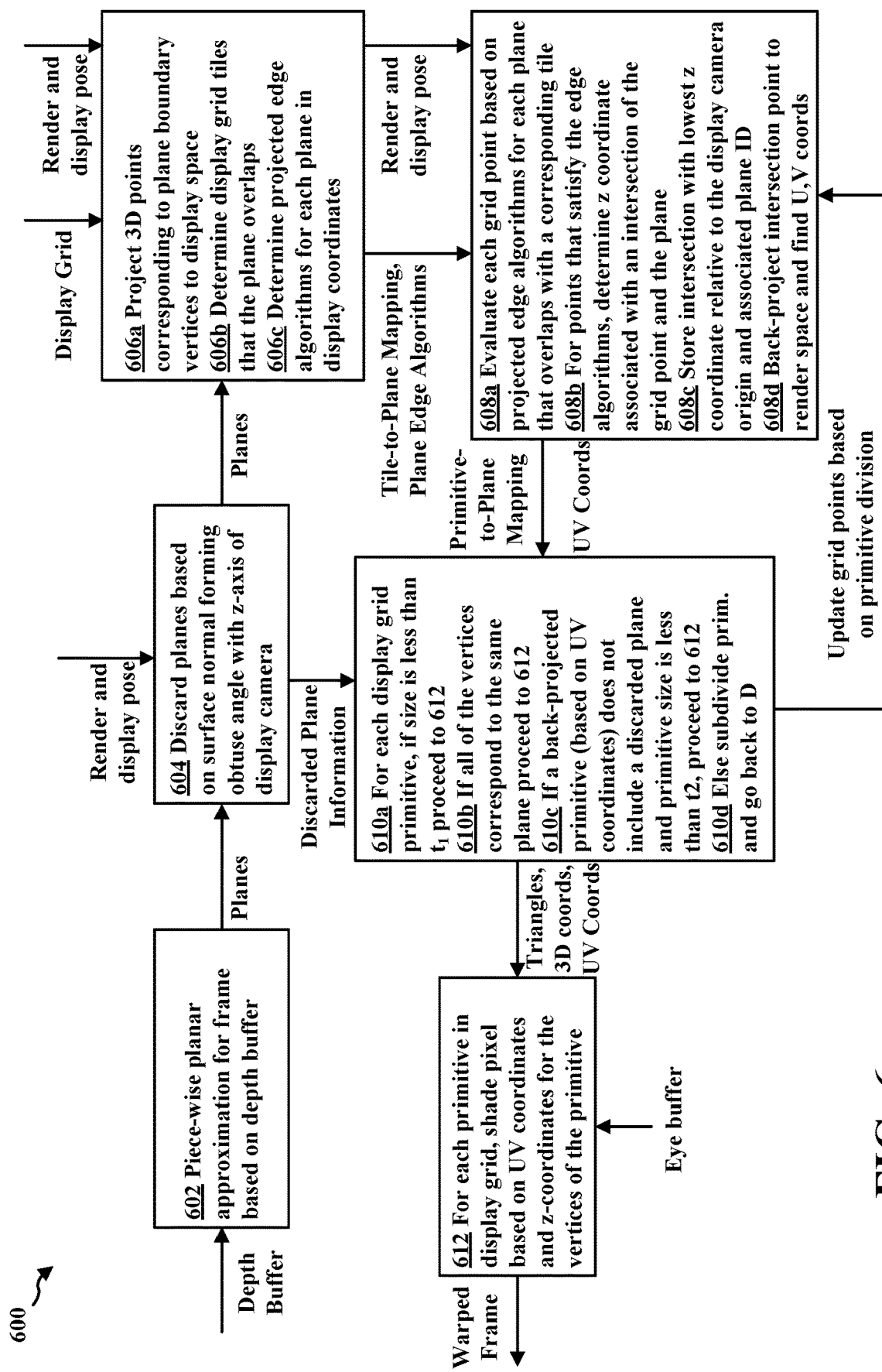
FIG. 6 is a flow diagram illustrating a reprojection algorithm in accordance with one or more techniques of this disclosure.

FIG. 6 is a flow diagram 600 illustrating a reprojection algorithm in accordance with one or more techniques of this disclosure. At 602, on the server-side of the wireless network, a piece-wise planar approximation for a frame may be performed based on a received depth buffer. The approximation performed, at 602, may be based on metadata extracted for each bounding box/tile associated with the frame. Planes indicative of the planar approximation may be transmitted to the client-side of the wireless network for performing the procedures associated with 604-612.

Based on the approximated planes, the bounding box information, and the render/display pose information, the client may determine a mapping for each plane between points in the render space to points in the display space. The mapping may be based on one or more geometric transformations. At 604, the client may discard certain planes indicated from the client when a surface normal of a plane forms an obtuse angle with a z-axis of a display camera. The discarded plane information may be indicated for procedures associated with determining triangles, coordinates, grid points, etc.

Tile-to-plane mapping and/or plane edge algorithms may be determined for the indicated planes based on a display grid and the render/display pose information. At 606a, the client may project three-dimensional points corresponding to plane boundary vertices into the display space. At 606b, the client may determine one or more display grid tiles that the plane overlaps. At 606c, the client may determine projected edge algorithms for each plane in the display coordinates. Based on the projected edge algorithms and/or the tile-to-plane mapping as well as the render/display pose information, the client may determine UV coordinates and a primitive-to-plane mapping.

At 608a, the client may evaluate each grid point based on the projected edge algorithms for each plane that overlaps with a corresponding tile. At 608b, for points that the projected edge algorithm, the client may determine a z-coordinate associated with an intersection of the grid point and the plane. At 608c, the client may store the intersection with the lowest z-coordinate relative to the display camera origin and associated plane identifier (ID). The primitive-to-plane mapping and UV coordinates may be used for determining triangles, three-dimensional coordinates, new grid points, etc.

At 610a, for each display grid primitive, if a size of the display grid primitive is less than a predetermined value $t_1$, the client may perform pixel shading, at 612. If the size of the display grid primitive is less than $t_1$, the client may also perform pixel shading, at 612, if, at 610b, all of the vertices correspond to the same plane. If all of the vertices do not correspond to the same plane, the client may perform pixel shading, at 612, if, at 610c, a back-projected primitive (e.g., based on UV coordinates) does not include a discarded plane, and the size of the display grid primitive is less than a second predetermined value $t_2$. If the back-projected primitive or the size of the display grid is greater than or equal to $t_2$, the client may update the grid points based on primitive division and repeat the procedures at 608a-608d.

Pixel shading may be performed, at 612, based on the eye buffer, triangles, three-dimensional coordinates, and UV coordinates. For example, at 612, for each primitive in the display grid, the client may shade one or more pixels based on the UV coordinates and the z-coordinate for the vertices of the primitive. The client may subsequently output information indicative of a warped frame. For instance, a display texture/frame may be indicated based on the eye buffer texture and the mapping determined via geometric transformation.

While each tile of the grid may correspond to a bounding box that encloses a portion of the depth buffer, the flow diagram 600 is not limited to bounding boxes based on a grid. Further, grid tiling may include uniform tiles or tiles that are subdivided into smaller tiles (e.g., based on one or more modeling errors). For example, bounding boxes that include an increased reprojection error rate may be subdivided into smaller grid blocks for which planes may again be defined/determined and transmitted to the client-side reprojection algorithm. Sub-dividing the grid tiles into smaller tiles may be performed to reduce modeling errors caused by larger grid tiles.

Figure 7:
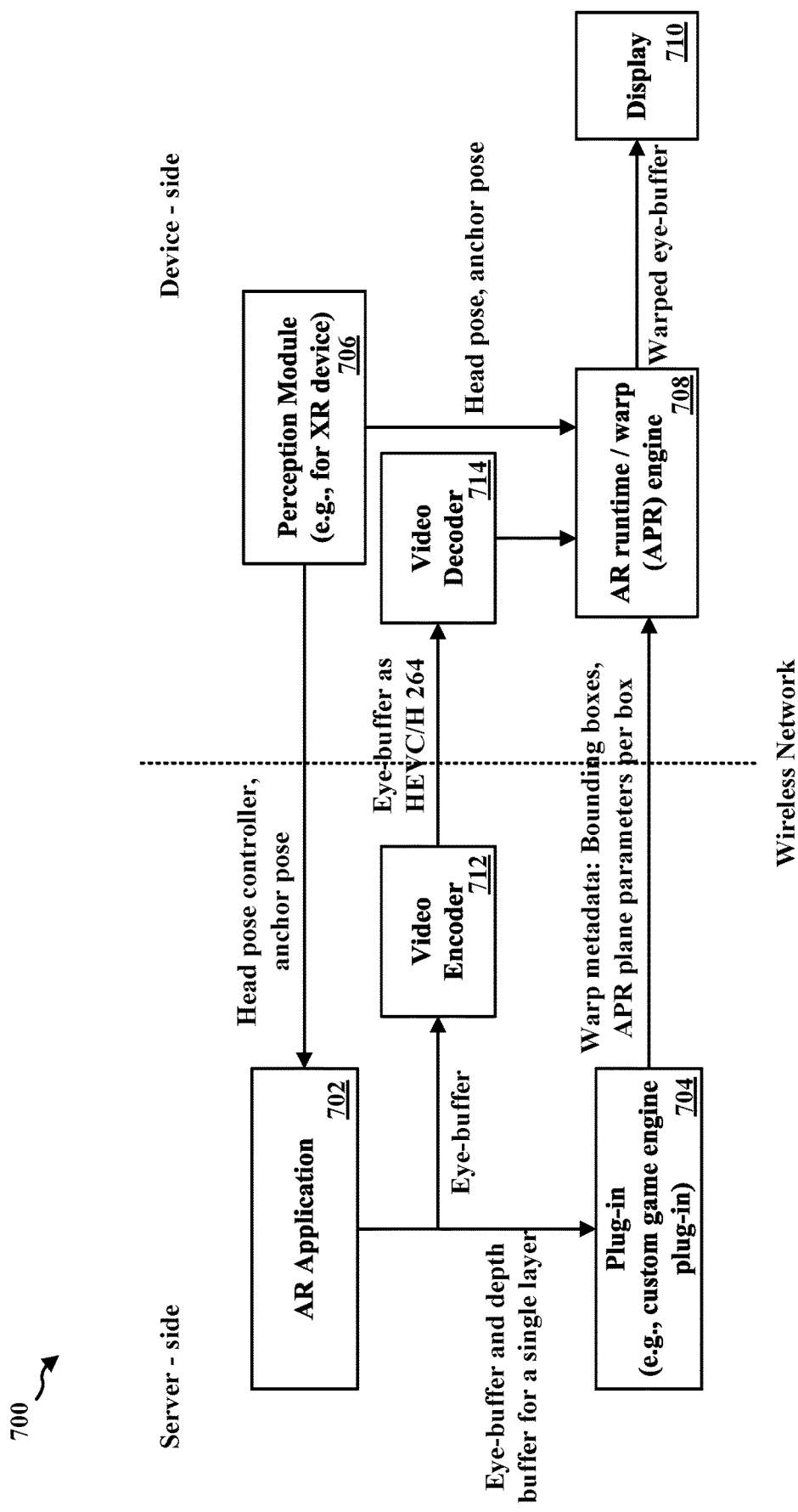
FIG. 7 is a flow diagram illustrating rendering and display techniques that are split among a server device and a client device in accordance with one or more techniques of this disclosure.

FIG. 7 is a flow diagram 700 illustrating rendering and display processes that are split among a server device on a server-side of a wireless network and a client device on a device-side of the wireless network in accordance with one or more techniques of this disclosure. Based on processing limitations of extended reality (XR) client devices, such as AR headsets, rendering operations may be offloaded from a first device (e.g., client device, such as the AR headset) to a second device (e.g., server device, such as a smartphone, remote server, edge server, etc.) that is connected to the first device by a wireless link. The server-side device may execute the AR application 702 based on an input, such as a head pose input, a controller input, an anchor pose input, etc., received from a perception module 706 of the client device (e.g., XR device) to render the virtual content in the eye buffer and/or depth buffer. A controller may be connected to either the client device or the server device for providing the controller input.

The AR application 702 may render the eye buffer and/or the depth buffer for a single layer and provide the buffer(s) to a plug-in 704 (e.g., a custom game engine plug-in). The plug-in 704 may determine metadata derived from rendering operations, where the metadata may indicate bounding box/tile reprojection information and/or APR plane parameters.

Processing limitations of the client device may cause the metadata, which may be used for warping the content of the bounding boxes/tiles, to be extracted via the server-side device before being provided to the client-side device. A video encoder 712 may receive the eye buffer on the server-side and wirelessly transmit encoded information (e.g., transmit the eye buffer as a high efficiency video coding (HEVC)/H.264 or other video coding standard bitstream) to a video decoder 714 on the client-side that decodes the encoded information. The metadata extracted on the server-side may be encoded in a same bitstream as video of the eye buffer and decoded from the bitstream at the client.

The AR runtime/warp (APR) engine 708 may receive the decoded eye buffer from the video decoder 714 in addition to head pose and/or anchor pose information from the perception module 706 to warp the content included in the bounding boxes/tiles indicated by the metadata received from the eye buffer. For example, the perception module 706 may provide the head pose and/or anchor pose information based on a determination/measurement that occurs prior to warping the content (e.g., immediately prior to warping the content). A warped eye buffer including the warped content may be subsequently provided to a display 710 of the client device for displaying the warped virtual content.

Figure 8:
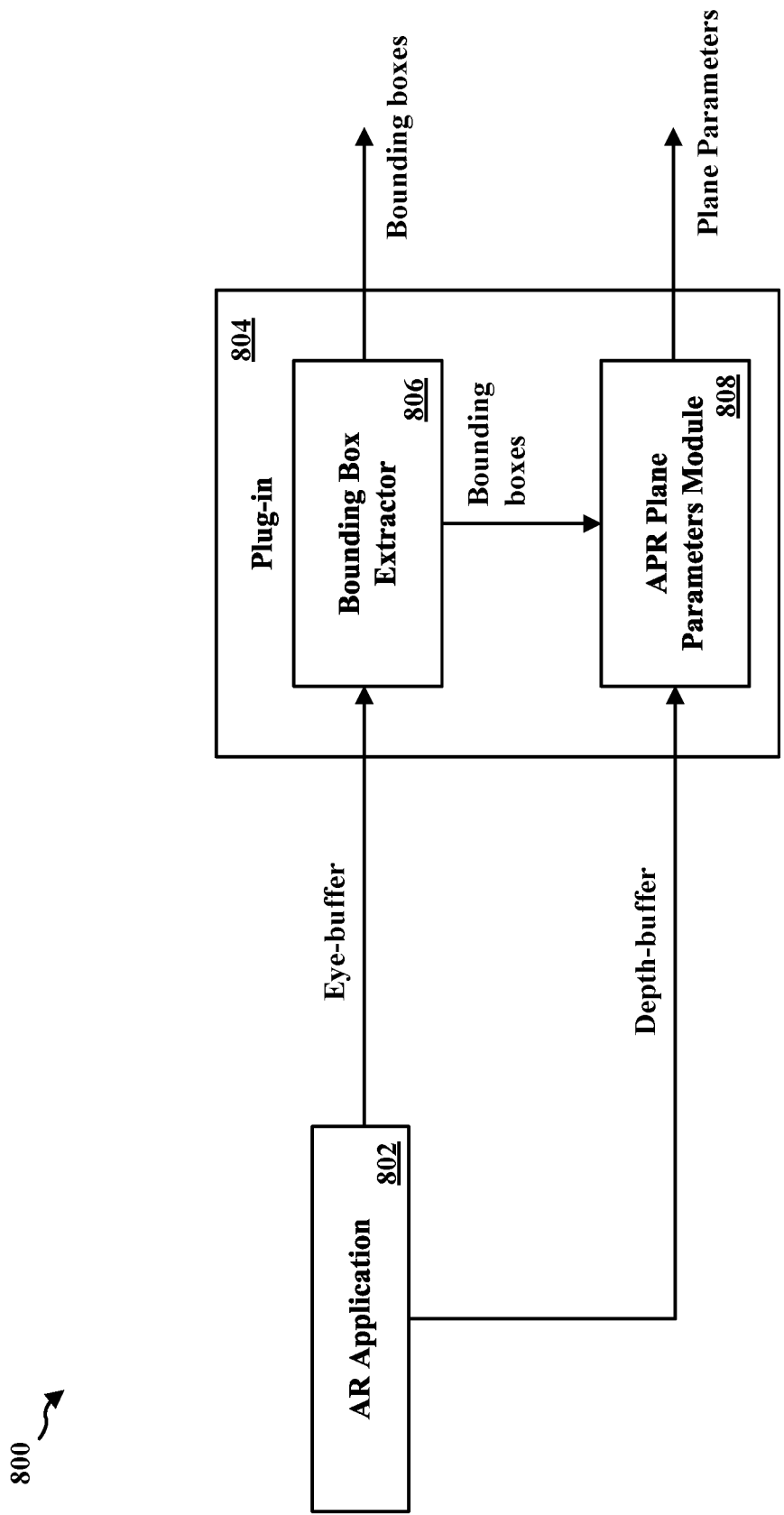
FIG. 8 is a flow diagram for extracting metadata utilized for warping virtual content in accordance with one or more techniques of this disclosure.

FIG. 8 is a flow diagram 800 for extracting metadata utilized for warping virtual content in accordance with one or more techniques of this disclosure. The AR application 802 may generate an eye buffer and a depth buffer that may be provided to the plug-in 804 (e.g., the custom game engine plug-in). The eye buffer may be received by a bounding box extractor 806 included in the plug-in 804. The bounding box extractor 806 may be configured to split received eye buffer information with respect to the multiple layers (e.g., pseudo layers) that include the virtual content from the AR application 802. In aspects, a query for objects included in the eye buffer may provide a basis for generating the bounding boxes.

Connected component analysis may be used to determine closed contours in the eye buffer that fully contain rendered objects from the AR application 802 to generate the respective bounding boxes/multiple layers. Translucent pixels between the rendered content may provide an indication of the closed/separated contours including each of the virtual objects. The closed contours may also be indicated based on bounding boxes that are merged with respect to object overlaps (e.g., a single bounding box may be defined around two overlapping objects). A final configuration of the bounding boxes may be polygonal/irregular or the bounding boxes may be redefined as multiple non-overlapping rectangles. The bounding box extractor 806 may cause the bounding boxes to be modified based on an intersection/union of the bounding boxes, which may cause a subsequent set of bounding boxes to be generated for performing the warping. The closed contours may correspond to bounding box metadata that is subsequently transmitted to the warp engine.

The depth buffer from the AR application 802 may be received by an APR plane parameters module 808 configured to determine the plane parameters for each bounding box indicated by the bounding box extractor 806. The APR plane parameters module 808 may determine an approximated plane within each of the indicated bounding boxes and provide such parameters to the warp engine as metadata along with the bounding box metadata transmitted to the warp engine from the bounding box extractor 806.

Figure 9:
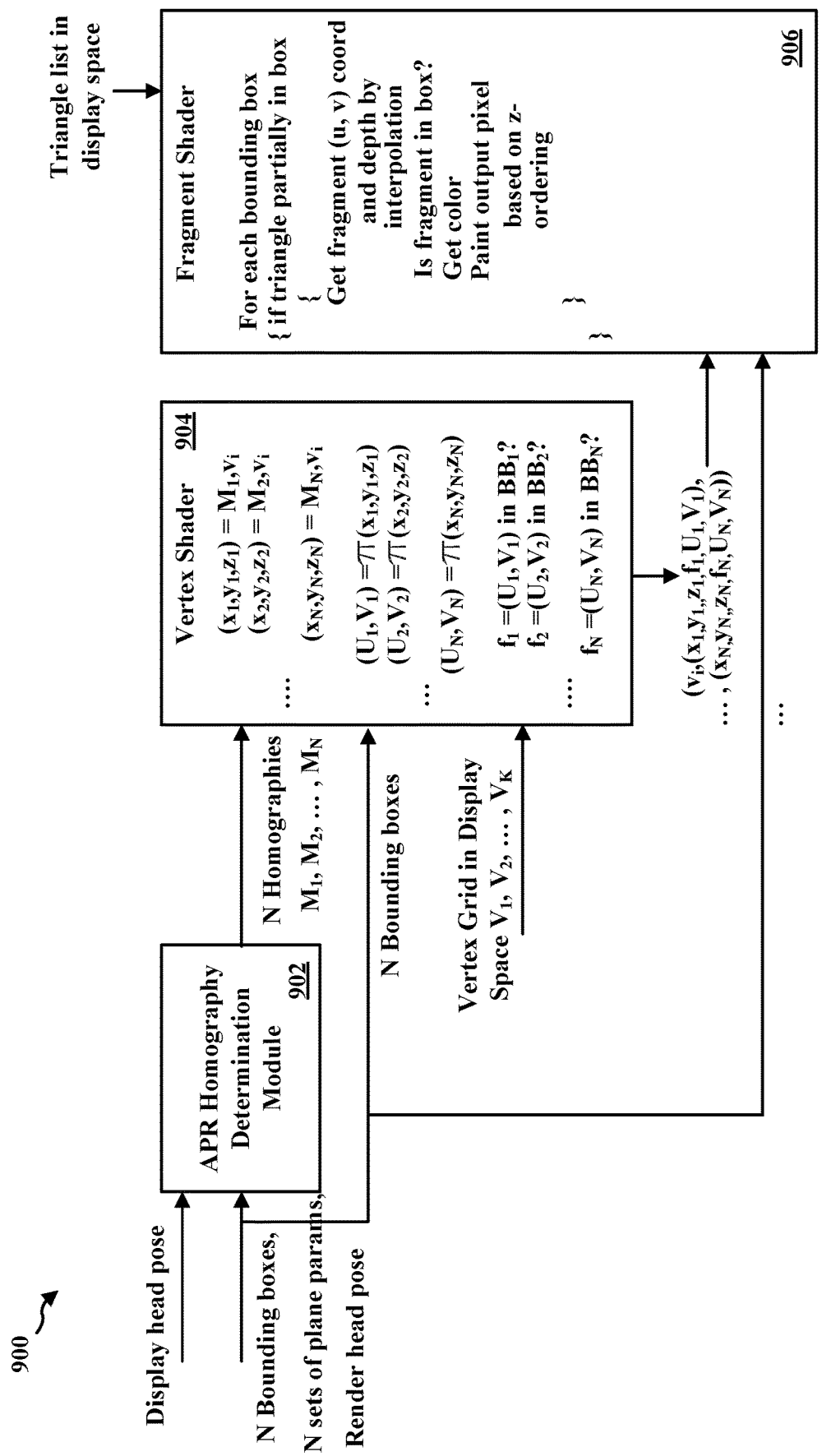
FIG. 9 is a flow diagram illustrating a one-step warping technique based on a vertex grid defined for a display space in accordance with one or more techniques of this disclosure.

FIG. 9 is a flow diagram 900 illustrating a one-step warping technique based on a vertex grid defined for a display space in accordance with one or more techniques of this disclosure. In aspects, multiple layers may be processed at a same time by the warp engine to reduce double data rate (DDR) transfers. A vertex shader 904 may perform APR homography with respect to each of the bounding boxes based on receiving, as input, N homographies from an APR homography determination module 902 that receives the display pose, the N bounding boxes, N sets of plane parameters, and the rendered head pose. Hence, N matrix transformations (e.g., $M_1, M_2, \ldots, M_N$) may be performed on a rendered image, so that the corresponding N homographies may be applied to the eye buffer jointly in a single warping step. After the content is warped, lens distortion and display correction may be performed prior to displaying the rendered content to further reduce geometric errors in the rendered image.

A vertex grid may be defined in the display space to provide a one-time step warping technique that allows for constant corrections, such as for lens distortion correction (LDC) or chromatic aberration compensation (CAC), to be pre-applied at initialization rather than applying the LDC/CAC separately for each frame. The vertex shader 904 may receive the vertex grid in the display space as a set of vertices (e.g., $V_1, V_2, \ldots, V_K$) and apply the N homographies determined from the N transformations (e.g., $M_1, M_2, \ldots, M_N$) to the set of vertices.

To determine where a vertex in the display space is located in the eye buffer, a point in the display space may be mapped to one or more points in an eye buffer space. In examples, because each of the bounding boxes may be configured for different depths, the rendered content included in the bounding boxes may become overlapped as the display pose changes, which may thereby cause a same point in the display space to be mapped to multiple points in the eye buffer space. For every vertex, a mapping may be determined for the homographies associated with $(x_1, y_1, z_1)$ through $(x_N, y_N, z_N)$ to project the corresponding points to the eye buffer space. Coordinates for the points may be linked to the bounding boxes. However, if a point is determined to be outside of a specific bounding box in the display space when the point is projected based on a homography, content corresponding to such point in the display space may not be linked to the specific bounding box. Instead, the content may be determined based on a different bounding box. Flags $(f_1, f_2, \ldots, f_N)$ for each vertex may be used by the vertex shader 904 to determine whether a $(U_i, V_i)$ coordinate is within a bounding box or outside of the bounding box.

Vertex information including the $(U_i, V_i)$ coordinates, three-dimensional point locations, and whether the points are within a bounding box for each homography may be transmitted to a fragment shader 906 to determine triangle information for multiple triangles defined according to the initial set of vertices in the display space. For each triangle, the fragment shader 906 may determine from the vertices whether a triangle is at least partially included in the bounding box. If one or more of the vertices is associated with the flags $(f_1, f_2, \ldots, f_N)$, the fragment shader 906 may determine that the triangle is at least partially included in the bounding box such that the triangle may be rendered with the content of the bounding box. For every pixel the fragment shader 906 renders, both a color of the pixel and a depth of the pixel may be determined and associated with the bounding box for the plane.

Figure 10:
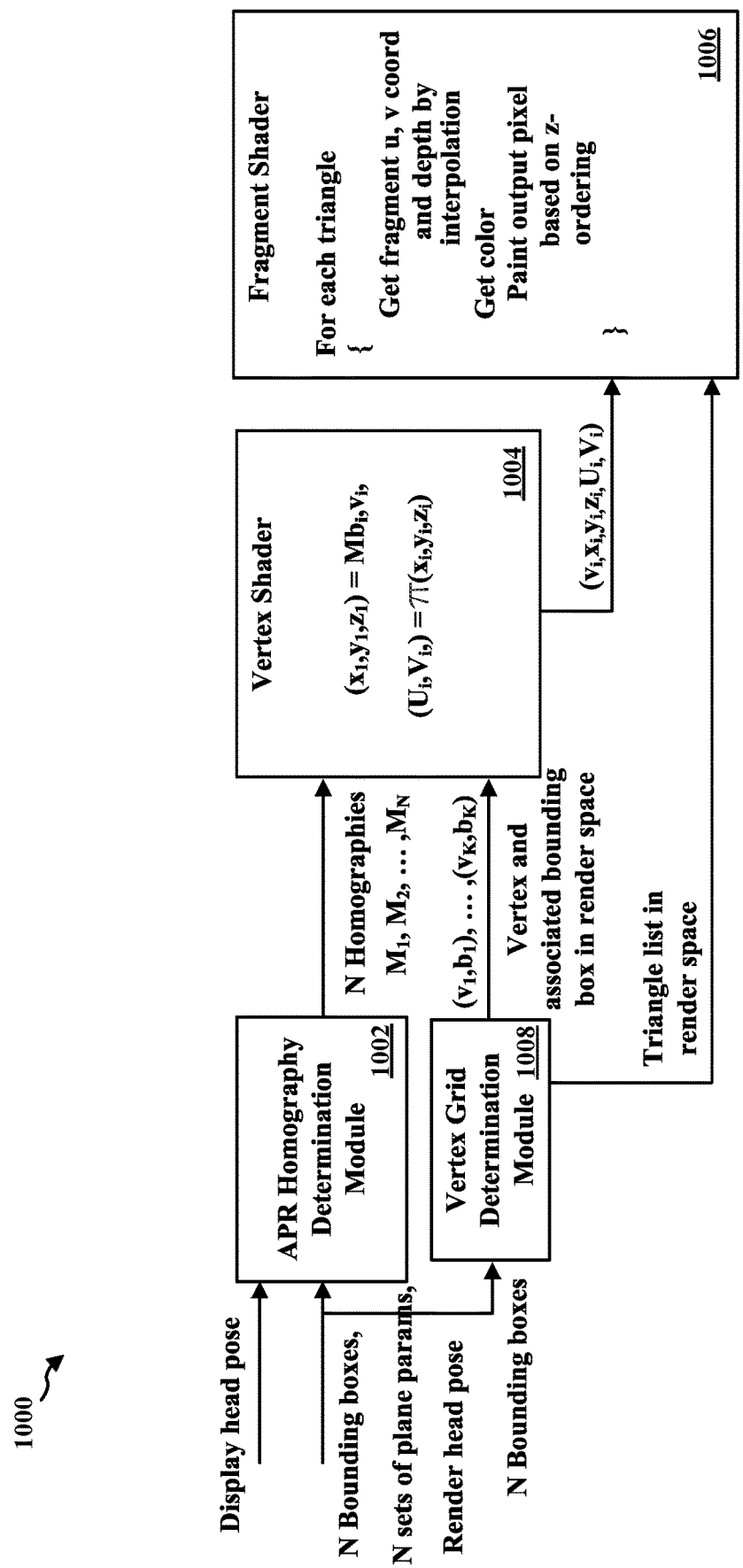
FIG. 10 is a flow diagram illustrating a one-step warping technique based on vertices defined in a rendered coordinate space in accordance with one or more techniques of this disclosure.

FIG. 10 is a flow diagram 1000 illustrating a one-step warping technique based on vertices defined in a rendered coordinate space in accordance with one or more techniques of this disclosure. The N bounding boxes for a frame may each be divided into a plurality of vertices by a vertex grid determination module 1008, so that each bounding box includes a respective set of vertices. Thus, complexities of the vertex shader 1004 may be reduced when applying the N matrix transformations $(M_1, M_2, \ldots, M_N)$ for the N homographies received from the APR homography determination module 1002 to the rendered coordinate space. For example, the vertex shader 1004 may determine the criteria for completing a given set of vertices based on a single matrix transformation that corresponds to the bounding box including the given set of vertices. The vertex shader 1004 may determine the $(x_i, y_i, z_i)$ coordinates which, in the display space, may be relative to the display pose. After the $(U_i, V_i)$ coordinate is determined in the display space, the vertex point in the eye buffer space may be determined based on an output of the vertex grid determination module 1008. The vertex shader 1004 may subsequently provide vertex information to the fragment shader 1006 to render both a color of the pixels and a depth of the pixels associated with the bounding box.

The vertices may be re-determined for each subsequent set of bounding boxes so that the vertex grid may be aligned with the bounding boxes. Alternatively, the bounding boxes may be defined so that the bounding boxes are aligned with a predetermined grid. For every triangle in a list of triangles for all of the bounding boxes, the pixels of a triangle may be mapped to the display space based on an output of the vertex shader 1004. The vertex shader 1004 may further perform distortion correction on the vertices by separately applying the LDC/CAC to each of the vertices and mapping the vertices to a proper location for the display pose on a per frame basis. However, the LDC/CAC may not be used for client devices, such as AR glasses.

In addition to APR techniques, other types of warping techniques may be applied to the bounding boxes. For example, asynchronous space warp may be applied for moving content included within the bounding boxes. Metadata associated with the content may be indicative of bounding box movements. Hence, motion vectors may be determined for a subset of points within a bounding box to apply the asynchronous space warp to the content.

A further warping technique may be to associate a parametrized mesh with a virtual surface of the content included in the bounding box (e.g., rather than determining plane parameters) and reproject the parametrized surface to perform the warp. While a plane may be defined as a parametrized mesh via the plane parameters (a, b, c), a more complex mesh may be defined for more complex surfaces (e.g., a mesh that corresponds to a spherical object). The parameters of the mesh may be associated with the metadata used for the reprojection/warping. The parametrization may be indicated based on a polynomial function (e.g., $z=f(x, y)$, where z is the approximated depth at pixel (x, y)). That is, the depth buffer z may be determined based on function $f(x, y)$ being solved for every pixel in the eye buffer to define the mesh that is to be incorporated within the bounding box. The parameters of the mesh (e.g., coefficients of the polynomial function) may then be used as the metadata for the reprojection/warping.

Figure 11:
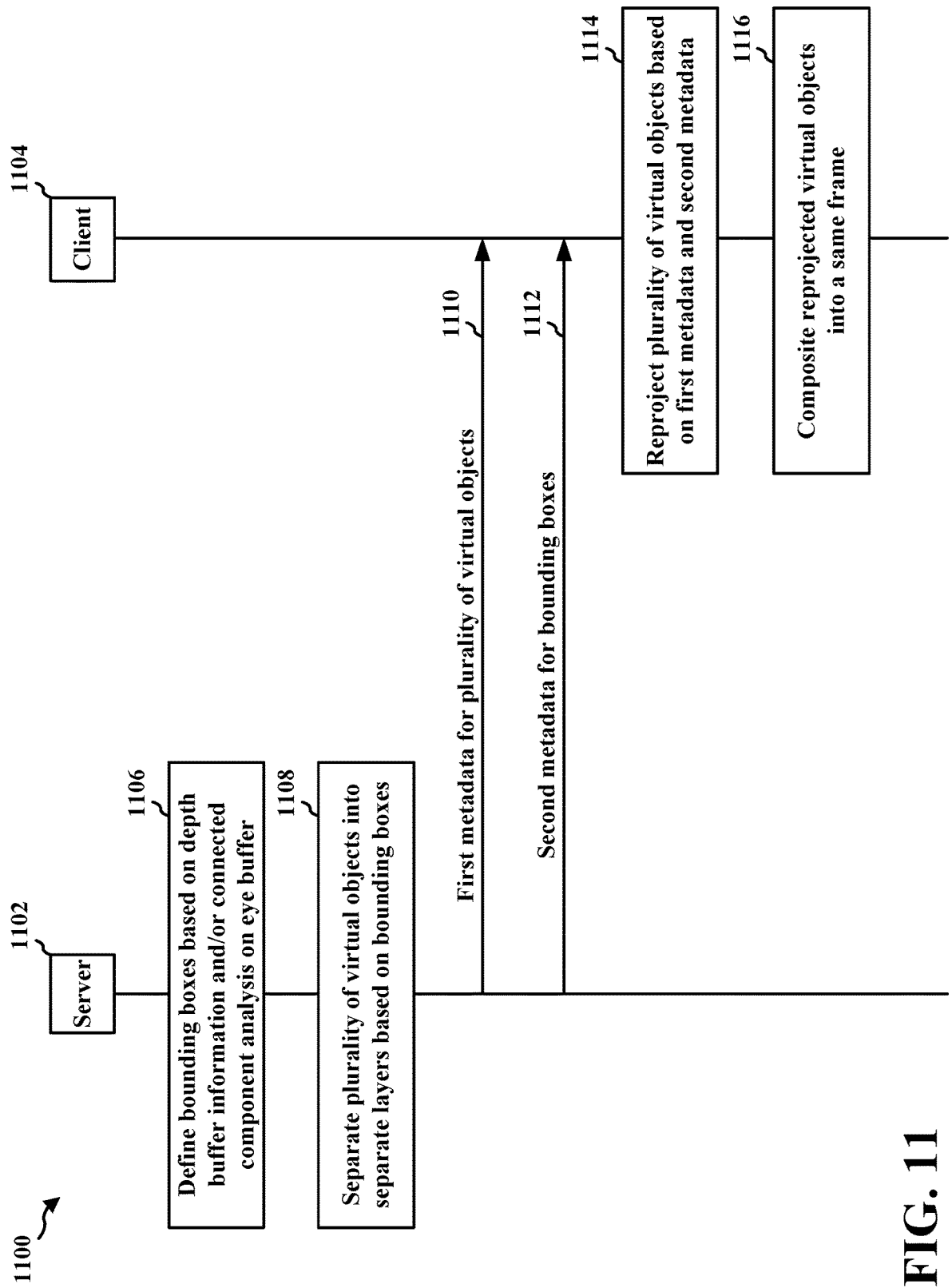
FIG. 11 is a call flow diagram illustrating example communications between a server and a client.

FIG. 11 is a call flow diagram 1100 illustrating example communications between a server 1102 and a client 1104. In a first aspect, the server 1102 and the client 1104 may be included in a same device. In a second aspect, the server 1102 and the client 1104 may be included in separate devices.

At 1106, the server may define bounding boxes for a plurality of virtual objects of a frame. The bounding boxes may be defined based on a depth buffer that includes depth information corresponding to the plurality of virtual objects. Additionally or alternatively, the bounding boxes may be defined based on a connected component analysis performed on an eye buffer that corresponds to the plurality of virtual objects. At 1108, the server 1102 may separate the plurality of virtual objects into separate layers based on the bounding boxes defined, at 1106. For example, each of the virtual objects included in the frame may correspond to respective bounding boxes associated with the separate layers.

At 1110, the server 1102 may transmit first metadata for the plurality of virtual objects to the client 1104. The first metadata may be indicative of one or more edges of the bounding boxes defined, at 1106. At 1112, the server 1102 may transmit second metadata for the bounding boxes based on separating, at 1108, the plurality of virtual objects into the separate layers associated with the respective bounding boxes. The second metadata may be indicative of plane parameters used for warping the bounding boxes that include the plurality of virtual objects.

At 1114, the client 1104 may reproject the plurality of virtual objects based on the first metadata received, at 1110, associated with the plurality of virtual objects and the second metadata received, at 1112, associated with warping the bounding boxes. At 1116, the client 1104 may composite the reprojected virtual objects into a same frame for being displayed on an XR display device.

Figure 12:
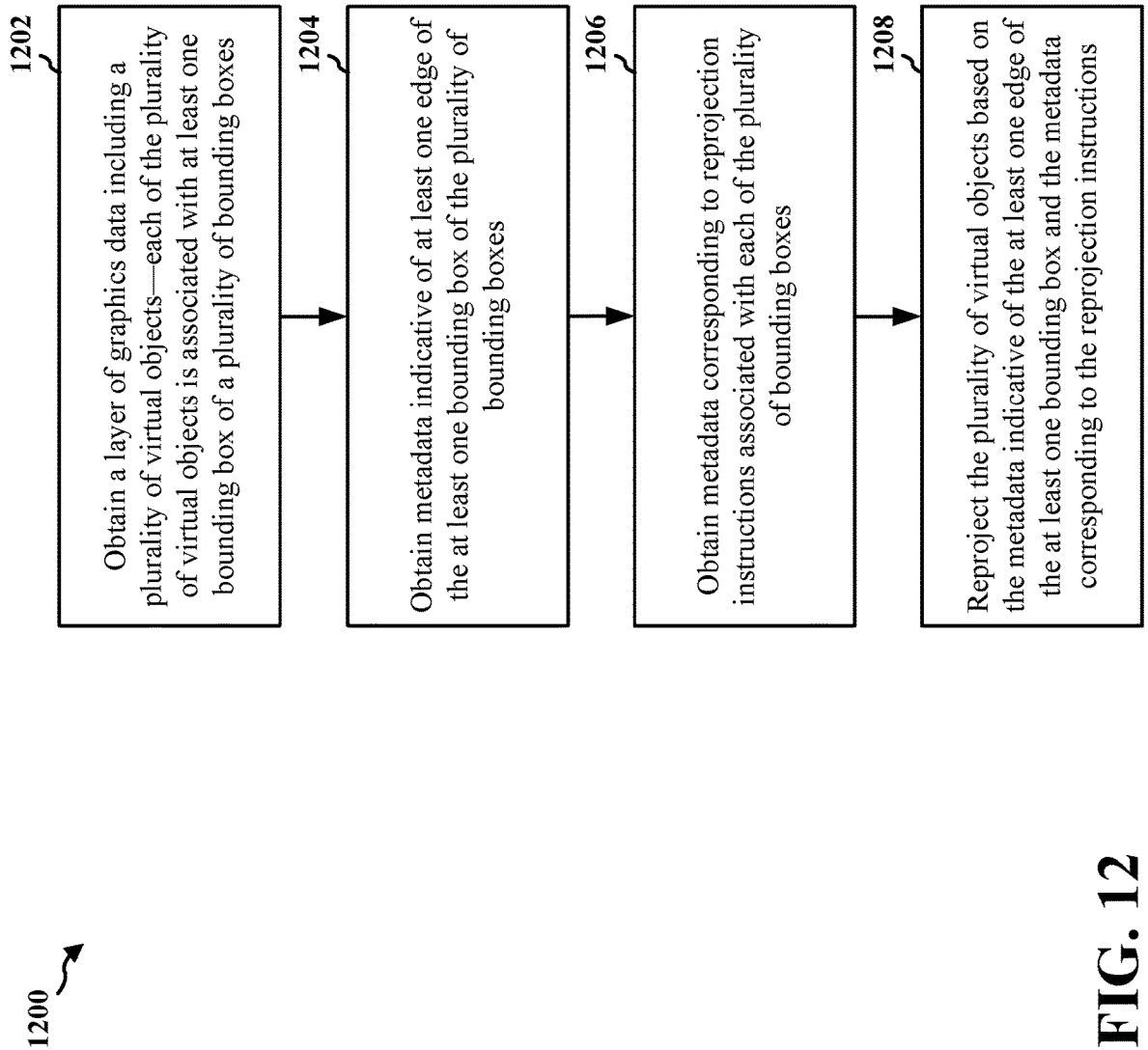
FIG. 12 is a flowchart of an example method of display processing in accordance with one or more techniques of this disclosure.

FIG. 12 is a flowchart 1200 of an example method of display processing in accordance with one or more techniques of this disclosure. The method may be performed by a device (e.g., client device), a display processor, a reprojection module/engine, an apparatus such as a wireless communication device, and the like, as used in connection with the examples of FIGS. 1-11.

At 1202, the device may obtain a layer of graphics data including a plurality of virtual objects—each of the plurality of virtual objects is associated with at least one bounding box of a plurality of bounding boxes. For example, referring to FIG. 11, the client 1104 may receive, at 1110, first metadata for a plurality of virtual objects. Further, display processor 127 in FIG. 1 may perform step 1202. Referring to FIGS. 2-4, the AR runtime/warp (APR) engine 308 may receive an image frame 306 including a plurality of virtual objects 202 in one layer of an eye buffer. The plurality of virtual objects 202 may be associated with metadata indicative of edges of the bounding boxes 204 that include the virtual objects 202.

At 1204, the device may obtain metadata indicative of at least one edge of the at least one bounding box of the plurality of bounding boxes. For example, referring to FIG. 11, the client 1104 may receive, at 1110, first metadata for a plurality of virtual objects. Further, display processor 127 in FIG. 1 may perform step 1204. Referring to FIGS. 2-4, the plurality of virtual objects 202 may be associated with metadata indicative of edges of the bounding boxes 204 that include the virtual objects 202.

At 1206, the device may obtain metadata corresponding to reprojection instructions associated with each of the plurality of bounding boxes. For example, referring to FIG. 11, the client 1104 may receive, at 1112, second metadata for the bounding boxes from the server 1102. Further, display processor 127 in FIG. 1 may perform step 1206. Referring to FIGS. 2-4, the AR runtime/warp (APR) engine 308 may receive reprojection metadata from the plug-in 304 for reprojecting each of the virtual objects 202 included in the image frame 306.

At 1208, the device may reproject the plurality of virtual objects based on the metadata indicative of the at least one edge of the at least one bounding box and the metadata corresponding to the reprojection instructions. For example, referring to FIG. 11, the client 1104 may reproject, at 1114, the plurality of virtual objects based on the first metadata received, at 1110, and the second metadata received, at 1112. Further, display processor 127 in FIG. 1 may perform step 1208. Referring to FIGS. 2-4, the AR runtime/warp (APR) engine 308 may separately reproject the virtual objects 202 to generate warped content 310 for the display 312 based on metadata received from the plug-in 304.

Figure 13:
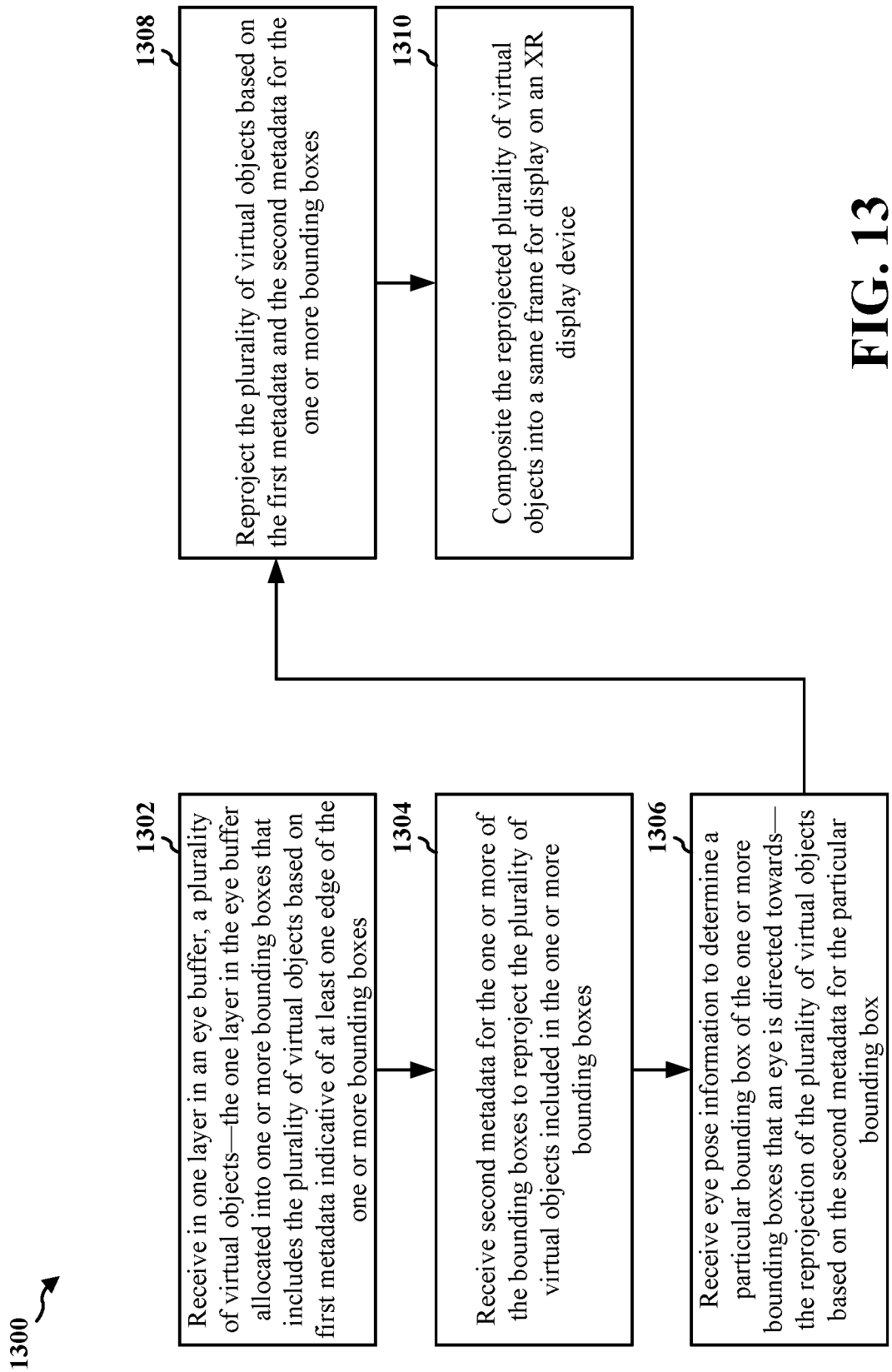
FIG. 13 is a flowchart of an example method of display processing in accordance with one or more techniques of this disclosure.

FIG. 13 is a flowchart 1300 of an example method of display processing in accordance with one or more techniques of this disclosure. The method may be performed by a device (e.g., client device), a display processor, a reprojection module/engine, an apparatus such as a wireless communication device, and the like, as used in connection with the examples of FIGS. 1-11.

At 1302, the device may receive in one layer in an eye buffer, a plurality of virtual objects—the one layer in the eye buffer allocated into one or more bounding boxes that includes the plurality of virtual objects based on first metadata indicative of at least one edge of the one or more bounding boxes. For example, referring to FIG. 11, the client 1104 may receive, at 1110, first metadata for a plurality of virtual objects. Further, display processor 127 in FIG. 1 may perform step 1302. Referring to FIGS. 2-4, the AR runtime/warp (APR) engine 308 may receive an image frame 306 including a plurality of virtual objects 202 in one layer of an eye buffer. The plurality of virtual objects 202 may be associated with metadata indicative of edges of the bounding boxes 204 that include the virtual objects 202. Each of the plurality of virtual objects 202 may be included in a respective one of the one or more bounding boxes 204. In aspects, referring to FIG. 5, the one or more bounding boxes 502 may be associated with a grid structure (e.g., grid 504), such that the plurality of virtual objects 202 may be included in one or more tiles 506 of the grid structure. The grid structure (e.g., grid 504) may be overlaid on the eye buffer. Each of the one or more tiles 506 may correspond to a separate bounding box of the one or more bounding boxes 502. The grid structure (e.g., grid 504) may include at least one of a uniform tile distribution, at least one subdivided tile, or at least one merged tile. In further aspects, the eye buffer may include a left eye buffer and a right eye buffer, such that a depth may be determined from a depth buffer by performing a DFS between the left eye buffer and the right eye buffer. The one or more bounding boxes 204 that include the plurality of virtual objects may be defined based on a connected component analysis performed on the eye buffer to determine closed contours that correspond to the plurality of virtual objects 202. Additionally or alternatively, the one or more bounding boxes 204 that include the plurality of virtual objects 202 may be defined based on a depth buffer in the one layer that includes depth information corresponding to the plurality of virtual objects 202.

At 1304, the device may receive second metadata for the one or more of the bounding boxes to reproject the plurality of virtual objects included in the one or more bounding boxes. For example, referring to FIG. 11, the client 1104 may receive, at 1112, second metadata for the bounding boxes from the server 1102. Further, display processor 127 in FIG. 1 may perform step 1304. Referring to FIGS. 2-4, the AR runtime/warp (APR) engine 308 may receive reprojection metadata from the plug-in 304 for reprojecting each of the virtual objects 202 included in the image frame 306. The second metadata may include at least one plane parameter (e.g., provided from the plug-in 304) for performing APR on the plurality of virtual objects 202. The second metadata may include at least one of anchor identifiers or pose information corresponding to the plurality of virtual objects 202 included in the one or more bounding boxes 204. The second metadata may include a parameterized mesh that corresponds to a virtual object 202 in the plurality of virtual objects 202. The second metadata may be received from a server device. For example, referring to FIG. 7, the second metadata may be received by the AR runtime/warp (APR) engine 708 on the device-side of the wireless network from the plug-in 704 on the server-side of the wireless network.

At 1306, the device may receive eye pose information to determine a particular bounding box of the one or more bounding boxes that an eye is directed towards—the reprojection of the plurality of virtual objects based on the second metadata for the particular bounding box. For example, referring to FIGS. 2 and 4, the AR runtime/warp (APR) engine 308 may receive eye pose information 402 to determine a certain bounding box included in the bounding boxes 204 that an eye is directed towards to reproject the virtual objects 202 based on metadata received from the plug-in 304 for the certain bounding box. Further, display processor 127 in FIG. 1 may perform step 1306.

At 1308, the device may reproject the plurality of virtual objects based on the first metadata and the second metadata for the one or more bounding boxes. For example, referring to FIG. 11, the client 1104 may reproject, at 1114, the plurality of virtual objects based on the first metadata received, at 1110, and the second metadata received, at 1112. Further, display processor 127 in FIG. 1 may perform step 1308. Referring to FIGS. 2-4, the AR runtime/warp (APR) engine 308 may separately reproject the virtual objects 202 to generate warped content 310 for the display 312 based on metadata received from the plug-in 304.

At 1310, the device may composite the reprojected plurality of virtual objects into a same frame for display on an XR display device. For example, referring to FIG. 11, the client 1104 may composite, at 1116, the reprojected virtual objects into a same frame. Further, display processor 127 in FIG. 1 may perform step 1310. Referring to FIGS. 2-4, the AR runtime/warp (APR) engine 308 may composite the reprojected virtual objects 202 into a same frame provided to a display 312 of a display device via a warped eye buffer.

In configurations, a method or an apparatus for display processing is provided. The apparatus may be a device (e.g., client device), a display processor, a DPU, a reprojection module/engine, or some other processor that may perform display processing. In aspects, the apparatus may be the display processor 127 within the device 104, or the apparatus may be some other hardware within the device 104 or another device. The apparatus includes means for obtain a layer of graphics data including a plurality of virtual objects, wherein each of the plurality of virtual objects is associated with at least one bounding box of a plurality of bounding boxes; means for obtain metadata indicative of at least one edge of the at least one bounding box of the plurality of bounding boxes; means for obtain metadata corresponding to reprojection instructions associated with each of the plurality of bounding boxes; and means for reproject the plurality of virtual objects based on the metadata indicative of the at least one edge of the at least one bounding box and the metadata corresponding to the reprojection instructions.

The apparatus further includes means for receiving in one layer in an eye buffer, a plurality of virtual objects, the one layer in the eye buffer allocated into one or more bounding boxes that includes the plurality of virtual objects based on first metadata indicative of an edge of the one or more bounding boxes; means for receiving second metadata for the one or more of the bounding boxes to reproject the plurality of virtual objects included in the one or more bounding boxes; and means for reprojecting the plurality of virtual objects based on the first metadata and the second metadata for the one or more bounding boxes. The apparatus further includes means for receiving eye pose information to determine a particular bounding box of the one or more bounding boxes that an eye is directed towards, the reprojection of the plurality of virtual objects based on the second metadata for the particular bounding box. The apparatus further includes means for compositing the reprojected plurality of virtual objects into a same frame for display on an XR display device.

Figure 14:
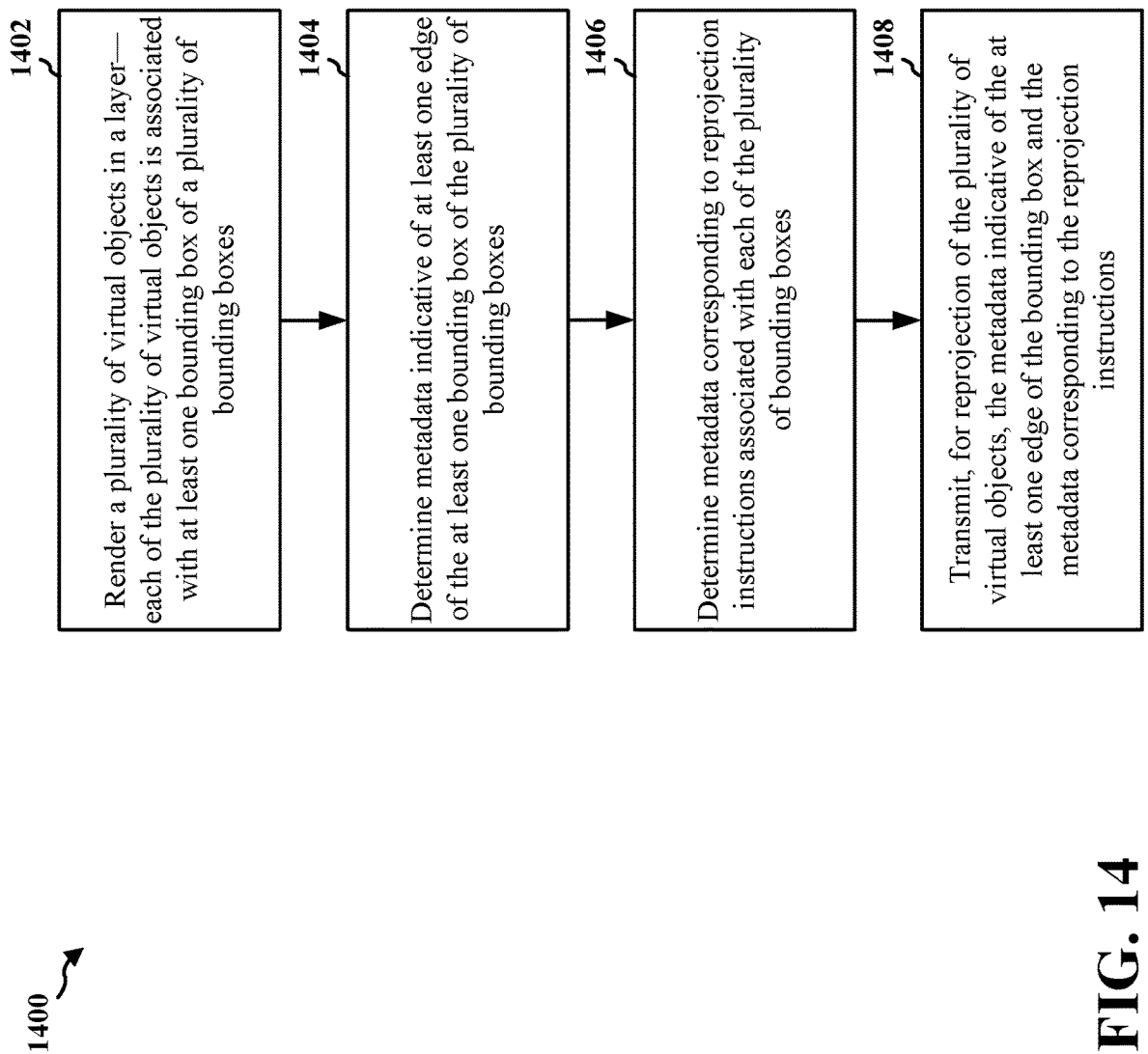
FIG. 14 is a flowchart of an example method of display processing in accordance with one or more techniques of this disclosure.

FIG. 14 is a flowchart 1400 of an example method of display processing in accordance with one or more techniques of this disclosure. The method may be performed by a device (e.g., server device), a display processor, an apparatus such as a wireless communication device, and the like, as used in connection with the examples of FIGS. 1-11.

At 1402, the device may render a plurality of virtual objects in a layer—each of the plurality of virtual objects is associated with at least one bounding box of a plurality of bounding boxes. For example, referring to FIGS. 2-4, the plurality of virtual objects 202 may be rendered by the AR application 302 in a single layer (e.g., via an eye-buffer and a depth buffer). The plurality of virtual objects 202 may be included in the bounding boxes 204. Further, display processor 127 in FIG. 1 may perform step 1402.

At 1404, the device may determine metadata indicative of at least one edge of the at least one bounding box of the plurality of bounding boxes. For example, referring to FIG. 11, the server 1102 may determine first metadata for a plurality of virtual objects to transmit, at 1110, first metadata to the client 1104. Further, display processor 127 in FIG. 1 may perform step 1404. Referring to FIGS. 2-4, the plurality of virtual objects 202 may be associated with metadata indicative of edges of the bounding boxes 204 that include the virtual objects 202.

At 1406, the device may determine metadata corresponding to reprojection instructions associated with each of the plurality of bounding boxes. For example, referring to FIG. 11, the server 1102 may determine second metadata for the bounding boxes to transmit, at 1112, the second metadata to the client 1102. Further, display processor 127 in FIG. 1 may perform step 1406.

At 1408, the device may transmit, for reprojection of the plurality of virtual objects, the metadata indicative of the at least one edge of the bounding box and the metadata corresponding to the reprojection instructions. For example, referring to FIG. 11, the server 1102 may transmit, at 1110, first metadata to the client 1104. The server 1102 may also transmit, at 1112, second metadata to the client 1102. Referring to FIGS. 2-4, the plurality of virtual objects 202 may be associated with metadata indicative of edges of the bounding boxes 204 that include the virtual objects 202. The reprojection metadata may be transmitted from the plug-in 304 to the AR runtime/warp (APR) engine 308 for reprojecting each of the virtual objects 202 included in the image frame 306. Further, display processor 127 in FIG. 1 may perform step 1406.

Figure 15:
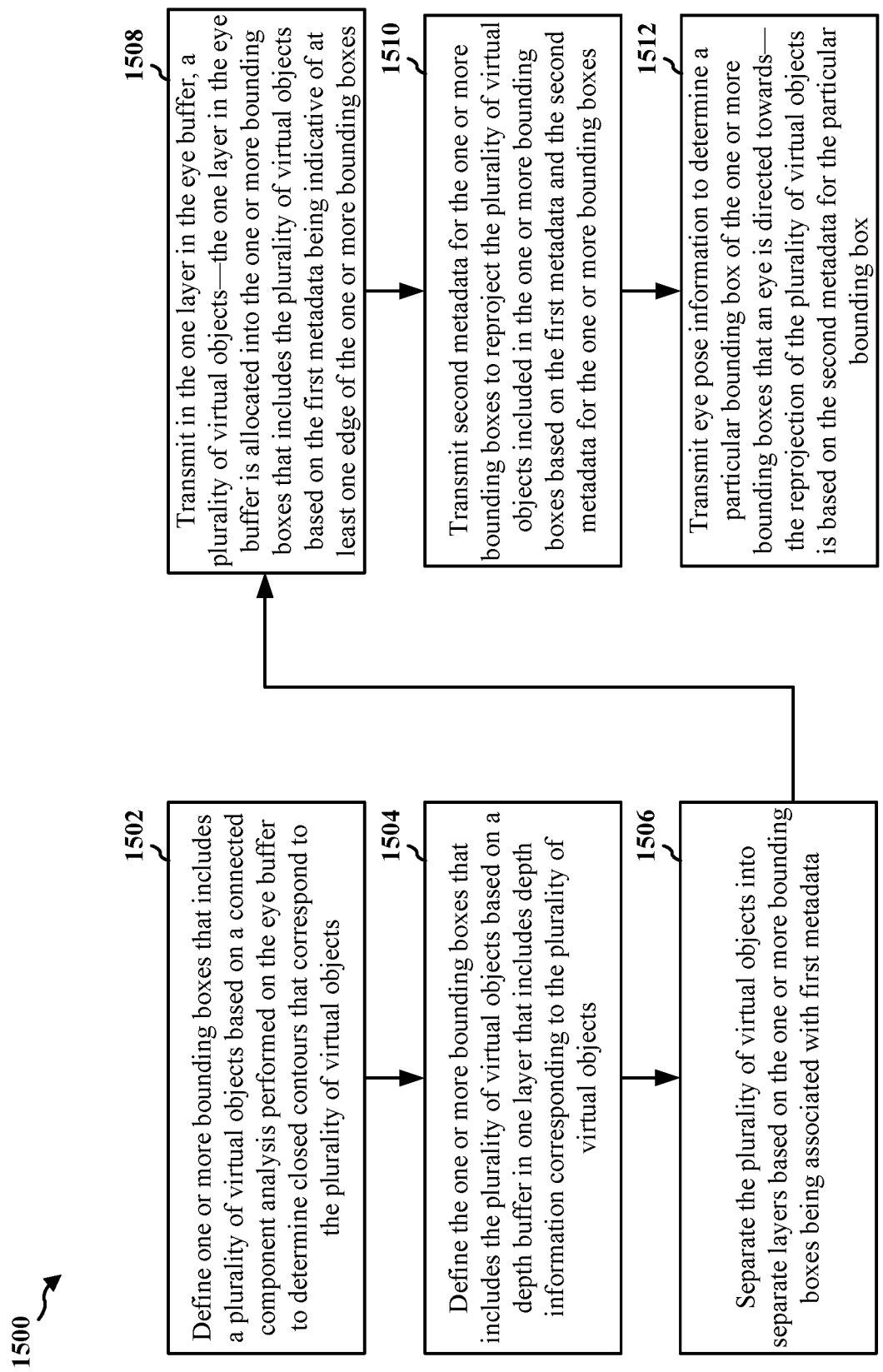
FIG. 15 is a flowchart of an example method of display processing in accordance with one or more techniques of this disclosure.

FIG. 15 is a flowchart 1500 of an example method of display processing in accordance with one or more techniques of this disclosure. The method may be performed by a device (e.g., server device), a display processor, an apparatus such as a wireless communication device, and the like, as used in connection with the examples of FIGS. 1-11.

At 1502, the device may define one or more bounding boxes that includes a plurality of virtual objects based on a connected component analysis performed on the eye buffer to determine closed contours that correspond to the plurality of virtual objects. For example, referring to FIG. 11, the server 1102 may define bounding boxes, at 1106, based on a connected component analysis performed on the eye buffer. Further, display processor 127 in FIG. 1 may perform step 1502.

At 1504, the device may define the one or more bounding boxes that includes the plurality of virtual objects based on a depth buffer in one layer that includes depth information corresponding to the plurality of virtual objects. For example, referring to FIG. 11, the server 1102 may define bounding boxes, at 1106, based on depth buffer information included in the depth buffer. Further, display processor 127 in FIG. 1 may perform step 1504.

At 1506, the device may separate the plurality of virtual objects into separate layers based on the one or more bounding boxes being associated with first metadata. For example, referring to FIG. 11, the server 1102 may separate, at 1108, the plurality of virtual objects into separate layers based on the bounding boxes defined, at 1106. Further, display processor 127 in FIG. 1 may perform step 1506. Referring to FIGS. 2-4, the AR runtime/warp (APR) engine 308 may separate the plurality of virtual objects 202 included in the image frame 306 of the eye buffer into multiple layers based on the bounding boxes 204 indicated in the image frame 306.

At 1508, the device may transmit in the one layer in the eye buffer, a plurality of virtual objects—the one layer in the eye buffer is allocated into the one or more bounding boxes that includes the plurality of virtual objects based on the first metadata being indicative of at least one edge of the one or more bounding boxes. For example, referring to FIG. 11, the server 1102 may transmit, at 1110, first metadata for a plurality of virtual objects. Further, display processor 127 in FIG. 1 may perform step 1508. Referring to FIGS. 2-4, the AR application 302 may transmit an image frame 306 including a plurality of virtual objects 202 in one layer of an eye buffer. The plurality of virtual objects 202 may be associated with metadata indicative of edges of the bounding boxes 204 that include the virtual objects 202. Each of the plurality of virtual objects 202 may be included in a respective one of the one or more bounding boxes 204. In aspects, referring to FIG. 5, the one or more bounding boxes 502 may be associated with a grid structure (e.g., grid 504), such that the plurality of virtual objects 202 may be included in one or more tiles 506 of the grid structure. The grid structure (e.g., grid 504) may be overlaid on the eye buffer. Each of the one or more tiles 506 may correspond to a separate bounding box of the one or more bounding boxes 502. The grid structure (e.g., grid 504) may include at least one of a uniform tile distribution, at least one subdivided tile, or at least one merged tile. In further aspects, the eye buffer may include a left eye buffer and a right eye buffer, such that a depth may be determined from a depth buffer by performing a DFS between the left eye buffer and the right eye buffer.

At 1510, the device may transmit second metadata for the one or more bounding boxes to reproject the plurality of virtual objects included in the one or more bounding boxes based on the first metadata and the second metadata for the one or more bounding boxes. For example, referring to FIG. 11, the server 1102 may transmit, at 1112, second metadata for the bounding boxes to the client 1104. Further, display processor 127 in FIG. 1 may perform step 1510. Referring to FIGS. 2-4, the plug-in 304 may transmit reprojection metadata to the AR runtime/warp (APR) engine 308 for reprojecting each of the virtual objects 202 included in the image frame 306. The second metadata may include at least one plane parameter (e.g., provided from the plug-in 304) for performing APR on the plurality of virtual objects 202. The second metadata may include at least one of anchor identifiers or pose information corresponding to the plurality of virtual objects 202 included in the one or more bounding boxes 204. The second metadata may include a parameterized mesh that corresponds to a virtual object 202 in the plurality of virtual objects 202. The second metadata may be transmitted to a client device. For example, referring to FIG. 7, the second metadata may be transmitted to the AR runtime/warp (APR) engine 708 on the device-side of the wireless network from the plug-in 704 on the server-side of the wireless network. The reprojected plurality of virtual objects may be composited into a same frame for display on an XR display device (e.g., display 710).

At 1512, the device may transmit eye pose information to determine a particular bounding box of the one or more bounding boxes that an eye is directed towards—the reprojection of the plurality of virtual objects is based on the second metadata for the particular bounding box. For example, referring to FIGS. 2 and 4, the AR runtime/warp (APR) engine 308 may receive eye pose information 402 to determine a certain bounding box included in the bounding boxes 204 that an eye is directed towards to reproject the virtual objects 202 based on metadata received from the plug-in 304 for the certain bounding box. Further, display processor 127 in FIG. 1 may perform step 1512.

In configurations, a method or an apparatus for display processing is provided. The apparatus may be a device (e.g., server device), a display processor, a DPU, or some other processor that may perform display processing. In aspects, the apparatus may be the display processor 127 within the device 104, or the apparatus may be some other hardware within the device 104 or another device. The apparatus includes means for rendering a plurality of virtual objects in a layer, wherein each of the plurality of virtual objects is associated with at least one bounding box of a plurality of bounding boxes; means for determining metadata indicative of at least one edge of the at least one bounding box of the plurality of bounding boxes; means for determining metadata corresponding to reprojection instructions associated with each of the plurality of bounding boxes; and means for transmitting, for reprojection of the plurality of virtual objects, the metadata indicative of the at least one edge of the bounding box and the metadata corresponding to the reprojection instructions.

The apparatus further includes means for transmitting in one layer in an eye buffer, a plurality of virtual objects, the one layer in the eye buffer allocated into one or more bounding boxes that includes the plurality of virtual objects based on first metadata indicative of at least one edge of the one or more bounding boxes; and means for transmitting second metadata for the one or more of the bounding boxes to reproject the plurality of virtual objects included in the one or more bounding boxes, where the plurality of virtual objects is reprojected based on the first metadata and the second metadata for the one or more bounding boxes. The apparatus further includes means for defining the one or more bounding boxes that includes the plurality of virtual objects based on a connected component analysis performed on the eye buffer to determine closed contours that correspond to the plurality of virtual objects. The apparatus further includes means for defining the one or more bounding boxes that includes the plurality of virtual objects based on a depth buffer in the one layer that includes depth information corresponding to the plurality of virtual objects. The apparatus further includes means for transmitting eye pose information to determine a particular bounding box of the one or more bounding boxes that an eye is directed towards, the reprojection of the plurality of virtual objects based on the second metadata for the particular bounding box. The apparatus further includes means for separating the plurality of virtual objects into separate layers based on the one or more bounding boxes associated with the first metadata.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interrupted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques could be fully implemented in one or more circuits or logic elements.

The following aspects are illustrative only and may be combined with other aspects or teachings described herein, without limitation.

Aspect 1 is an apparatus for display processing including at least one processor coupled to a memory and configured to obtain a layer of graphics data including a plurality of virtual objects, where each of the plurality of virtual objects is associated with at least one bounding box of a plurality of bounding boxes; obtain metadata indicative of at least one edge of the at least one bounding box of the plurality of bounding boxes; obtain metadata corresponding to reprojection instructions associated with each of the plurality of bounding boxes; and reproject the plurality of virtual objects based on the metadata indicative of the at least one edge of the at least one bounding box and the metadata corresponding to the reprojection instructions.

Aspect 2 may be combined with aspect 1 and includes that each of the plurality of virtual objects is included in a respective one of the plurality of bounding boxes.

Aspect 3 may be combined with any of aspects 1 and includes that the plurality of bounding boxes is associated with a grid structure and the plurality of virtual objects is included in one or more tiles of the grid structure.

Aspect 4 may be combined with any of aspects 1 or 3 and includes that the grid structure is overlaid on an eye buffer.

Aspect 5 may be combined with any of aspects 1 or 3-4 and includes that each of the one or more tiles corresponds to a separate bounding box of the plurality of bounding boxes.

Aspect 6 may be combined with any of aspects 1 or 3-5 and includes that the grid structure includes at least one of a uniform tile distribution, at least one subdivided tile, or at least one merged tile.

Aspect 7 may be combined with any of aspects 1-6 and includes that the metadata corresponding to the reprojection instructions includes at least one plane parameter for performing APR on the plurality of virtual objects.

Aspect 8 may be combined with any of aspects 1-7 and includes that the metadata corresponding to the reprojection instructions includes at least one of anchor identifiers or pose information corresponding to the plurality of virtual objects associated with the at least one bounding box.

Aspect 9 may be combined with any of aspects 1-8 and includes that the metadata corresponding to the reprojection instructions is obtained from a server device.

Aspect 10 may be combined with any of aspects 1-9 and includes that the at least one bounding box associated with the plurality of virtual objects is defined based on a connected component analysis performed on an eye buffer, the connected component analysis indicative of closed contours that correspond to the plurality of virtual objects.

Aspect 11 may be combined with any of aspects 1-10 and includes that the at least one bounding box associated with the plurality of virtual objects is defined based on a depth buffer that includes depth information corresponding to the plurality of virtual objects.

Aspect 12 may be combined with any of aspects 1-11 and includes that the at least one processor is further configured to obtain eye pose information to determine a particular bounding box of the plurality of bounding boxes that an eye is directed towards, where the reprojection of the plurality of virtual objects is based on the metadata corresponding to the reprojection instructions being associated with the particular bounding box.

Aspect 13 may be combined with any of aspects 1-12 and includes that an eye buffer includes a left eye buffer and a right eye buffer, and where a depth is determined from a depth buffer based on a DFS between the left eye buffer and the right eye buffer.

Aspect 14 may be combined with any of aspects 1-13 and includes that the metadata corresponding to the reprojection instructions includes a parameterized mesh that corresponds to a virtual object of the plurality of virtual objects.

Aspect 15 may be combined with any of aspects 1-14 and includes that the at least one processor is further configured to composite the reprojected plurality of virtual objects into a same frame for display on an XR display device.

Aspect 16 may be combined with any of aspects 1-15 and includes that the apparatus is wireless communication device.

Aspect 17 is an apparatus for display processing including at least one processor coupled to a memory and configured to render a plurality of virtual objects in a layer, where each of the plurality of virtual objects is associated with at least one bounding box of a plurality of bounding boxes; determine metadata indicative of at least one edge of the at least one bounding box of the plurality of bounding boxes; determine metadata corresponding to reprojection instructions associated with each of the plurality of bounding boxes; and transmit, for reprojection of the plurality of virtual objects, the metadata indicative of the at least one edge of the bounding box and the metadata corresponding to the reprojection instructions.

Aspect 18 may be combined with aspect 17 and includes that each of the plurality of virtual objects is included in a respective one of the plurality of bounding boxes.

Aspect 19 may be combined with any of aspects 17 and includes that the plurality of bounding boxes is associated with a grid structure and the plurality of virtual objects is included in one or more tiles of the grid structure.

Aspect 20 may be combined with any of aspects 17 or 19 and includes that the grid structure is overlaid on an eye buffer.

Aspect 21 may be combined with any of aspects 17 or 19-20 and includes that each of the one or more tiles corresponds to a separate bounding box of the plurality of bounding boxes.

Aspect 22 may be combined with any of aspects 17 or 19-21 and includes that the grid structure includes at least one of a uniform tile distribution, at least one subdivided tile, or at least one merged tile.

Aspect 23 may be combined with any of aspects 17-22 and includes that the metadata corresponding to the reprojection instructions includes at least one plane parameter for performing APR on the plurality of virtual objects.

Aspect 24 may be combined with any of aspects 17-23 and includes that the metadata corresponding to the reprojection instructions includes at least one of anchor identifiers or pose information corresponding to the plurality of virtual objects associated with the one or more bounding boxes.

Aspect 25 may be combined with any of aspects 17-24 and includes that the metadata corresponding to the reprojection instructions is transmitted to a client device.

Aspect 26 may be combined with any of aspects 17-25 and includes that the at least one processor is further configured to define the at least one bounding box associated with the plurality of virtual objects based on a connected component analysis performed on an eye buffer, the connected component analysis indicative of closed contours that correspond to the plurality of virtual objects.

Aspect 27 may be combined with any of aspects 17-26 and includes that the at least one processor is further configured to define the at least one bounding box associated with the plurality of virtual objects based on a depth buffer that includes depth information corresponding to the plurality of virtual objects.

Aspect 28 may be combined with any of aspects 17-27 and includes that the at least one processor is further configured to transmit eye pose information to determine a particular bounding box of the plurality of bounding boxes that an eye is directed towards, where the reprojection of the plurality of virtual objects is based on the metadata corresponding to the reprojection instructions being associated with the particular bounding box.

Aspect 29 may be combined with any of aspects 17-28 and includes that an eye buffer includes a left eye buffer and a right eye buffer, and where a depth is determined from a depth buffer based on a DFS between the left eye buffer and the right eye buffer.

Aspect 30 may be combined with any of aspects 17-29 and includes that the metadata corresponding to the reprojection instructions includes a parameterized mesh that corresponds to a virtual object of the plurality of virtual objects.

Aspect 31 may be combined with any of aspects 17-30 and includes that the plurality of virtual objects is composited after the reprojection into a same frame for display on an extended reality XR display device.

Aspect 32 may be combined with any of aspects 17-31 and includes that the at least one processor is further configured to separate the plurality of virtual objects into separate layers based on the metadata indicative of the at least one edge of the at least one bounding box.

Aspect 33 may be combined with any of aspects 17-32 and includes that the apparatus is a wireless communication device.

Aspect 34 is a method of wireless communication for implementing any of aspects 1-33.

Aspect 35 is an apparatus for wireless communication including means for implementing any of aspects 1-33.

Aspect 36 is a computer-readable medium storing computer executable code, the code when executed by at least one processor causes the at least one processor to implement any of aspects 1-33.

Various examples have been described. These and other examples are within the scope of the following claims.

What is claimed is:

1. An apparatus for display processing, comprising:
a memory; and
at least one processor coupled to the memory and configured to:
obtain, from a rendering device separate from the apparatus;
a rendered layer of graphics data including a plurality of virtual objects, wherein each of the plurality of virtual objects is associated with at least one bounding box of a plurality of bounding boxes;
obtain, from the rendering device, first metadata indicative of at least one edge of the at least one bounding box of the plurality of bounding boxes;
obtain, from the rendering device, second metadata corresponding to reprojection instructions associated with each of the plurality of bounding boxes, wherein the second metadata corresponding to the reprojection instructions includes a parameterized mesh that corresponds to a virtual object of the plurality of virtual objects; and
reproject the plurality of virtual objects based on the first metadata indicative of the at least one edge of the at least one bounding box and the second metadata corresponding to the reprojection instructions.

2. The apparatus of claim 1, wherein each of the plurality of virtual objects is included in a respective one of the plurality of bounding boxes.

3. The apparatus of claim 1, wherein the plurality of bounding boxes is associated with a grid structure and the plurality of virtual objects is included in one or more tiles of the grid structure.

4. The apparatus of claim 3, wherein the grid structure is overlaid on an eye buffer.

5. The apparatus of claim 3, wherein each of the one or more tiles corresponds to a separate bounding box of the plurality of bounding boxes.

6. The apparatus of claim 3, wherein the grid structure includes at least one of a uniform tile distribution, at least one subdivided tile, or at least one merged tile.

7. The apparatus of claim 1, wherein the second metadata corresponding to the reprojection instructions includes at least one plane parameter for performing asynchronous planar reprojection (APR) on the plurality of virtual objects.

8. The apparatus of claim 1, wherein the second metadata corresponding to the reprojection instructions includes at least one of anchor identifiers or pose information corresponding to the plurality of virtual objects associated with the at least one bounding box.

9. The apparatus of claim 1, wherein to obtain the second metadata corresponding to the reprojection instructions, the at least one processor is configured to obtain the second metadata corresponding to the reprojection instructions from a server device.

10. The apparatus of claim 1, wherein the at least one bounding box associated with the plurality of virtual objects is defined based on a connected component analysis performed on an eye buffer, the connected component analysis indicative of closed contours that correspond to the plurality of virtual objects.

11. The apparatus of claim 1, wherein the at least one bounding box associated with the plurality of virtual objects is defined based on a depth buffer that includes depth information corresponding to the plurality of virtual objects.

12. The apparatus of claim 1, wherein the at least one processor is further configured to obtain eye pose information to determine a particular bounding box of the plurality of bounding boxes that an eye is directed towards, wherein the reprojection of the plurality of virtual objects is based on the second metadata corresponding to the reprojection instructions being associated with the particular bounding box.

13. The apparatus of claim 1, wherein an eye buffer includes a left eye buffer and a right eye buffer, and wherein a depth is determined from a depth buffer based on a depth-from-stereo (DFS) between the left eye buffer and the right eye buffer.

14. The apparatus of claim 1, wherein the at least one processor is further configured to composite the reprojected plurality of virtual objects into a same frame for display on an extended reality (XR) display device.

15. The apparatus of claim 1, wherein the apparatus is a wireless communication device.

16. An apparatus for display processing, comprising:
a memory; and
at least one processor coupled to the memory and configured to:
render a plurality of virtual objects in a layer, wherein each of the plurality of virtual objects is associated with at least one bounding box of a plurality of bounding boxes;
determine first metadata indicative of at least one edge of the at least one bounding box of the plurality of bounding boxes;
determine second metadata corresponding to reprojection instructions associated with each of the plurality of bounding boxes, wherein the second metadata corresponding to the reprojection instructions includes a parameterized mesh that corresponds to a virtual object of the plurality of virtual objects; and
transmit, for reprojection of the plurality of virtual objects at a display device, the first metadata indicative of the at least one edge of the at least one bounding box and the second metadata corresponding to the reprojection instructions.

17. The apparatus of claim 16, wherein each of the plurality of virtual objects is included in a respective one of the plurality of bounding boxes.

18. The apparatus of claim 16, wherein the plurality of bounding boxes is associated with a grid structure and the plurality of virtual objects is included in one or more tiles of the grid structure.

19. The apparatus of claim 18, wherein the grid structure is overlaid on an eye buffer.

20. The apparatus of claim 18, wherein each of the one or more tiles corresponds to a separate bounding box of the plurality of bounding boxes.

21. The apparatus of claim 18, wherein the grid structure includes at least one of a uniform tile distribution, at least one subdivided tile, or at least one merged tile.

22. The apparatus of claim 16, wherein the second metadata corresponding to the reprojection instructions includes at least one plane parameter for performing asynchronous planar reprojection (APR) on the plurality of virtual objects.

23. The apparatus of claim 16, wherein the second metadata corresponding to the reprojection instructions includes at least one of anchor identifiers or pose information corresponding to the plurality of virtual objects associated with the at least one bounding box.

24. The apparatus of claim 16, wherein to transmit the second metadata corresponding to the reprojection instructions, the at least one processor is configured to transmit the second metadata corresponding to the reprojection instructions to a client device.

25. The apparatus of claim 16, wherein the at least one processor is further configured to define the at least one bounding box associated with the plurality of virtual objects based on a connected component analysis performed on an eye buffer, the connected component analysis indicative of closed contours that correspond to the plurality of virtual objects.

26. The apparatus of claim 16, wherein the at least one processor is further configured to define the at least one bounding box associated with the plurality of virtual objects based on a depth buffer that includes depth information corresponding to the plurality of virtual objects.

27. The apparatus of claim 16, wherein the at least one processor is further configured to transmit eye pose information to determine a particular bounding box of the plurality of bounding boxes that an eye is directed towards, wherein the reprojection of the plurality of virtual objects is based on the second metadata corresponding to the reprojection instructions being associated with the particular bounding box.

28. The apparatus of claim 16, wherein an eye buffer includes a left eye buffer and a right eye buffer, and wherein a depth is determined from a depth buffer based on a depth-from-stereo (DFS) between the left eye buffer and the right eye buffer.

29. The apparatus of claim 16, wherein the plurality of virtual objects is composited after the reprojection into a same frame for display on an extended reality (XR) display device.

30. The apparatus of claim 16, wherein the at least one processor is further configured to separate the plurality of virtual objects into separate layers based on the first metadata indicative of the at least one edge of the at least one bounding box.

31. The apparatus of claim 16, wherein the apparatus is a wireless communication device.

32. A method of display processing at a display device, comprising:
    obtaining, from a rendering device separate from the display device, a layer of graphics data including a plurality of virtual objects, wherein each of the plurality of virtual objects is associated with at least one bounding box of a plurality of bounding boxes;
    obtaining, from the rendering device, first metadata indicative of at least one edge of the at least one bounding box of the plurality of bounding boxes;
    obtaining, from the rendering device, second metadata corresponding to reprojection instructions associated with each of the plurality of bounding boxes, wherein the second metadata corresponding to the reprojection instructions includes a parameterized mesh that corresponds to a virtual object of the plurality of virtual objects; and
    reprojecting the plurality of virtual objects based on the first metadata indicative of the at least one edge of the at least one bounding box and the second metadata corresponding to the reprojection instructions.

33. A method of display processing at a rendering device, comprising:
    rendering a plurality of virtual objects in a layer, wherein each of the plurality of virtual objects is associated with at least one bounding box of a plurality of bounding boxes;
    determining first metadata indicative of at least one edge of the at least one bounding box of the plurality of bounding boxes;
    determining second metadata corresponding to reprojection instructions associated with each of the plurality of bounding boxes, wherein the second metadata corresponding to the reprojection instructions includes a parameterized mesh that corresponds to a virtual object of the plurality of virtual objects; and
    transmitting, for reprojection of the plurality of virtual objects at a display device, the first metadata indicative of the at least one edge of the at least one bounding box and the second metadata corresponding to the reprojection instructions.

* * * * *